(12) United States Patent
Rørvig et al.

(10) Patent No.: US 11,046,157 B2
(45) Date of Patent: Jun. 29, 2021

(54) DRIVE SYSTEM AND A TRUCK BED COMPRISING A ROLL-UP TRUCK BED COVER AND THE DRIVE SYSTEM

(71) Applicant: MOUNTAIN TOP INDUSTRIES ApS, Frederikssund (DK)

(72) Inventors: Simon Rørvig, Skibby (DK); Thomas Rendbeck Voetmann, Jyllinge (DK)

(73) Assignee: MOUNTAIN TOP INDUSTRIES APS, Frederikssund (DK)

( * ) Notice: Subject to any disclaimer, the term of this patent is extended or adjusted under 35 U.S.C. 154(b) by 0 days.

(21) Appl. No.: 17/050,416

(22) PCT Filed: Apr. 24, 2019

(86) PCT No.: PCT/DK2019/050125
§ 371 (c)(1),
(2) Date: Oct. 23, 2020

(87) PCT Pub. No.: WO2019/206388
PCT Pub. Date: Oct. 31, 2019

(65) Prior Publication Data
US 2021/0107343 A1     Apr. 15, 2021

(30) Foreign Application Priority Data

Apr. 20, 2018  (DK) .............. PA 201870246

(51) Int. Cl.
*B60J 7/057* (2006.01)
*B60J 7/04* (2006.01)
*B60J 7/06* (2006.01)

(52) U.S. Cl.
CPC ............. *B60J 7/0573* (2013.01); *B60J 7/041* (2013.01); *B60J 7/068* (2013.01)

(58) Field of Classification Search
CPC . B60J 7/041; B60J 7/057; B60J 7/0573; B60J 7/061; B60J 7/068; B60J 7/085
(Continued)

(56) References Cited

U.S. PATENT DOCUMENTS

| 4,138,154 A | 2/1979 | McKeon |
| 4,717,196 A * | 1/1988 | Adams ................... B60J 5/14 |
| | | 160/201 |

(Continued)

FOREIGN PATENT DOCUMENTS

DE     1266788     4/1968

OTHER PUBLICATIONS

Werbewunder: "Zahnriemen Spanner Zusammenbau and Test (Toothed belt tensioner with tension adjustment)", Oct. 29, 2017 (Oct. 29, 2017), pp. 1-3, XP054979601 Retrieved from the Internet: URL:https://www.youtube.com/watch?v=GfSZybQlw4U [retrieved on Aug. 15, 2019].

(Continued)

*Primary Examiner* — Jason S Daniels
(74) *Attorney, Agent, or Firm* — Winston & Strawn LLP

(57) ABSTRACT

A drive system serves for reciprocating, between an extended position and a retracted position, a roll-up truck bed cover above a truck bed, said roll-up truck bed cover being composed of a rear profile, a plurality of elongate slats that are hinged together and has a foremost front slat, said drive system comprising at least one reciprocating means adapted for reciprocating the roll-up truck bed cover, and at least one reversible electric motor adapted for driving the reciprocating means. The at least one reciprocating means comprises at least one pulley system comprising at least one set of pulleys and at least one drive belt, which at least one (Continued)

Figure 1A:
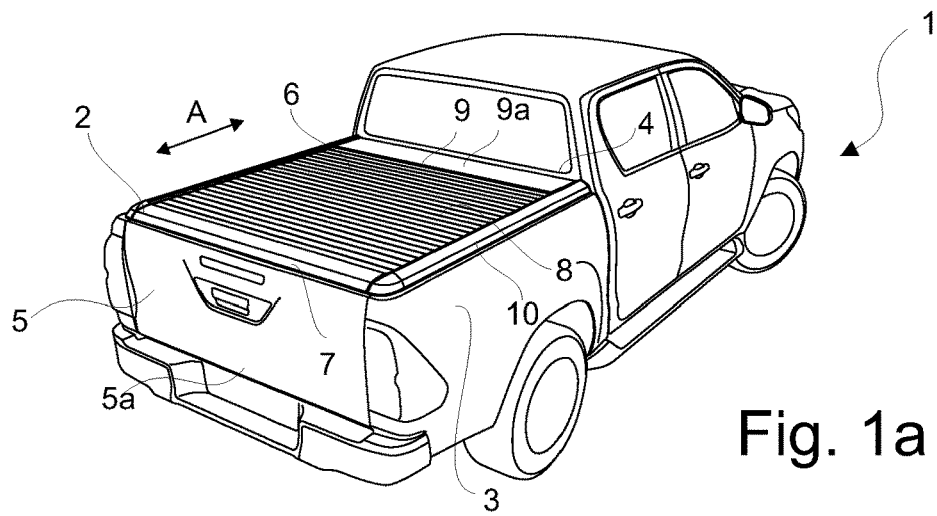

set of pulleys includes a driven pulley and an idle pulley, and the drive belt is secured to the rear profile of the roll-up truck bed cover.

23 Claims, 22 Drawing Sheets

(58) Field of Classification Search
USPC .................................. 296/98, 100.01, 100.09
See application file for complete search history.

(56) References Cited

U.S. PATENT DOCUMENTS

| 5,040,843 | A | 8/1991 | Russell et al. | |
|---|---|---|---|---|
| 6,893,072 | B1 | 5/2005 | Graves | |
| 9,365,097 | B1 | 6/2016 | Singer | |
| 9,827,838 | B2 | 11/2017 | Hannan et al. | |
| 2017/0341494 | A1* | 11/2017 | Hannan | B60J 7/068 |
| 2019/0054809 | A1* | 2/2019 | Bernardo | B60J 7/085 |

OTHER PUBLICATIONS

International Search Report and Written Opinion Appl. No. PCT/DK/2019/050125, dated Aug. 23, 2019.
International Preliminary Report on Patentability (IPRP), Appl. No. PCT/DK2019/050125, dated Aug. 4, 2020.

* cited by examiner

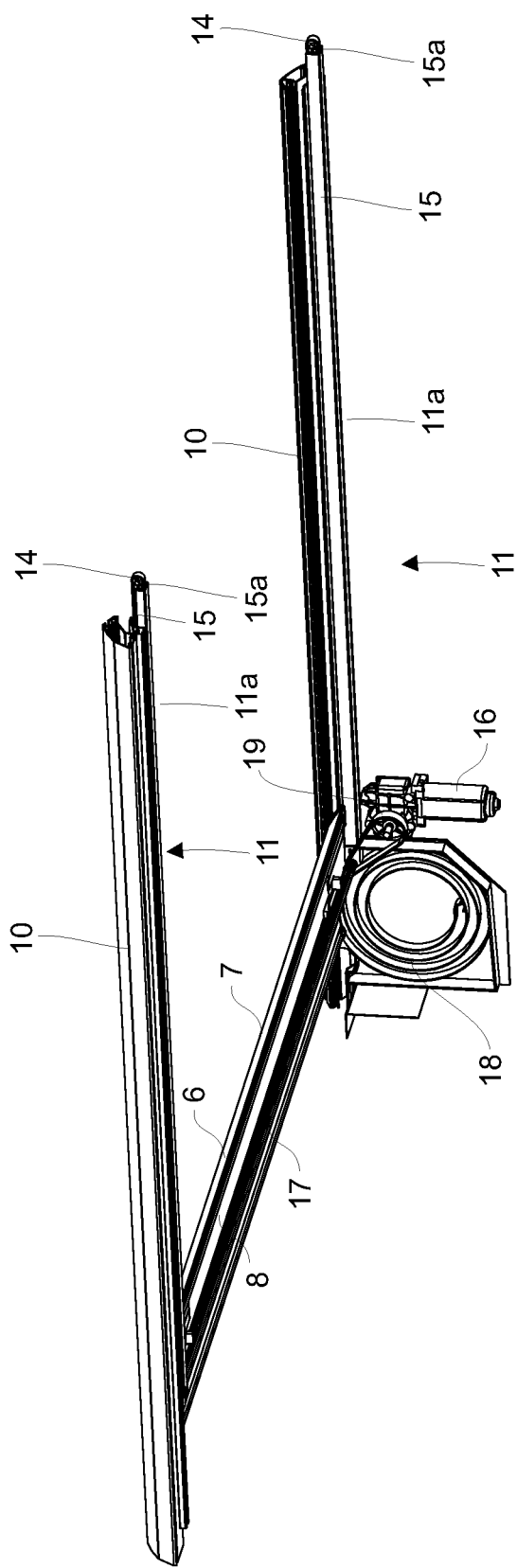

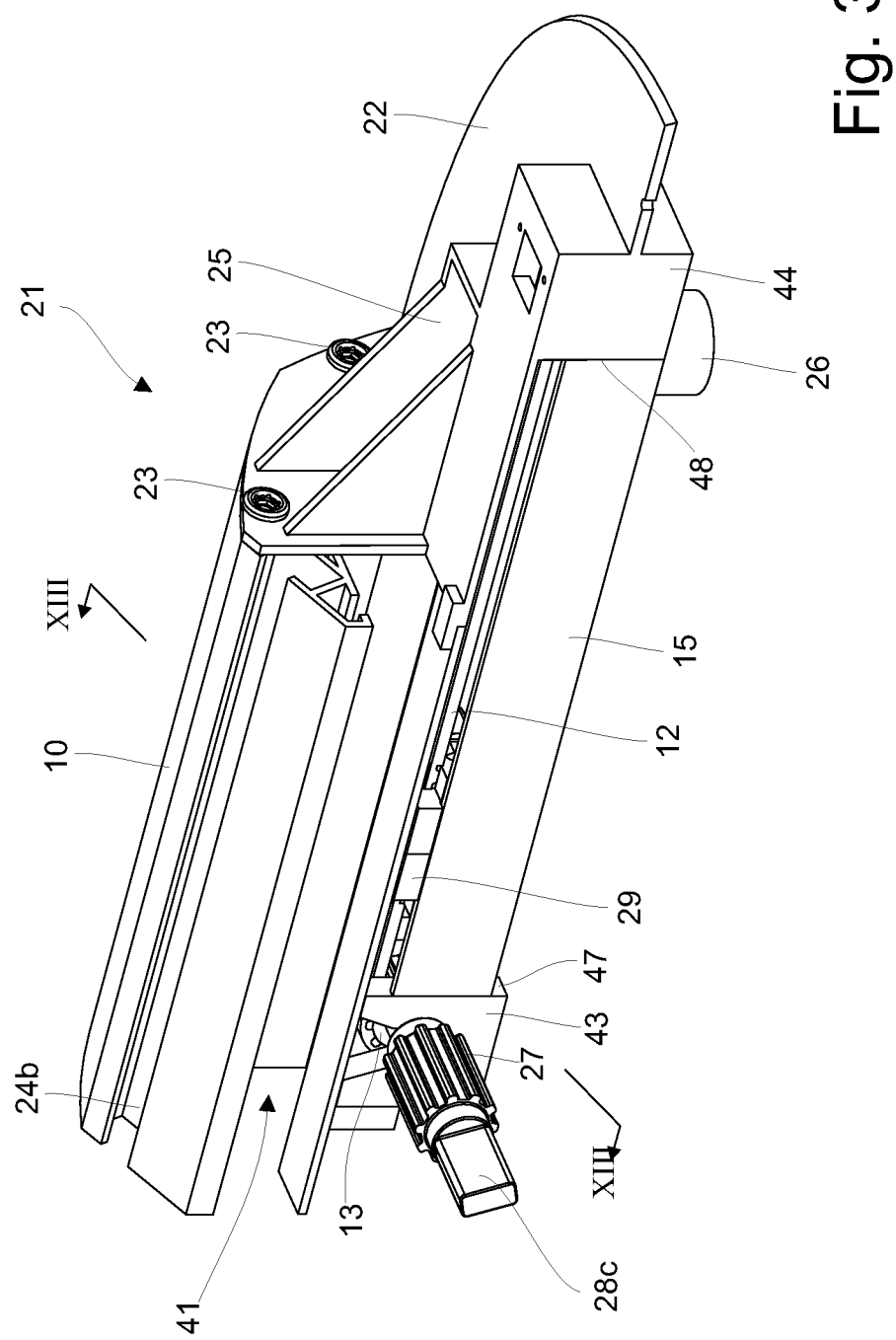

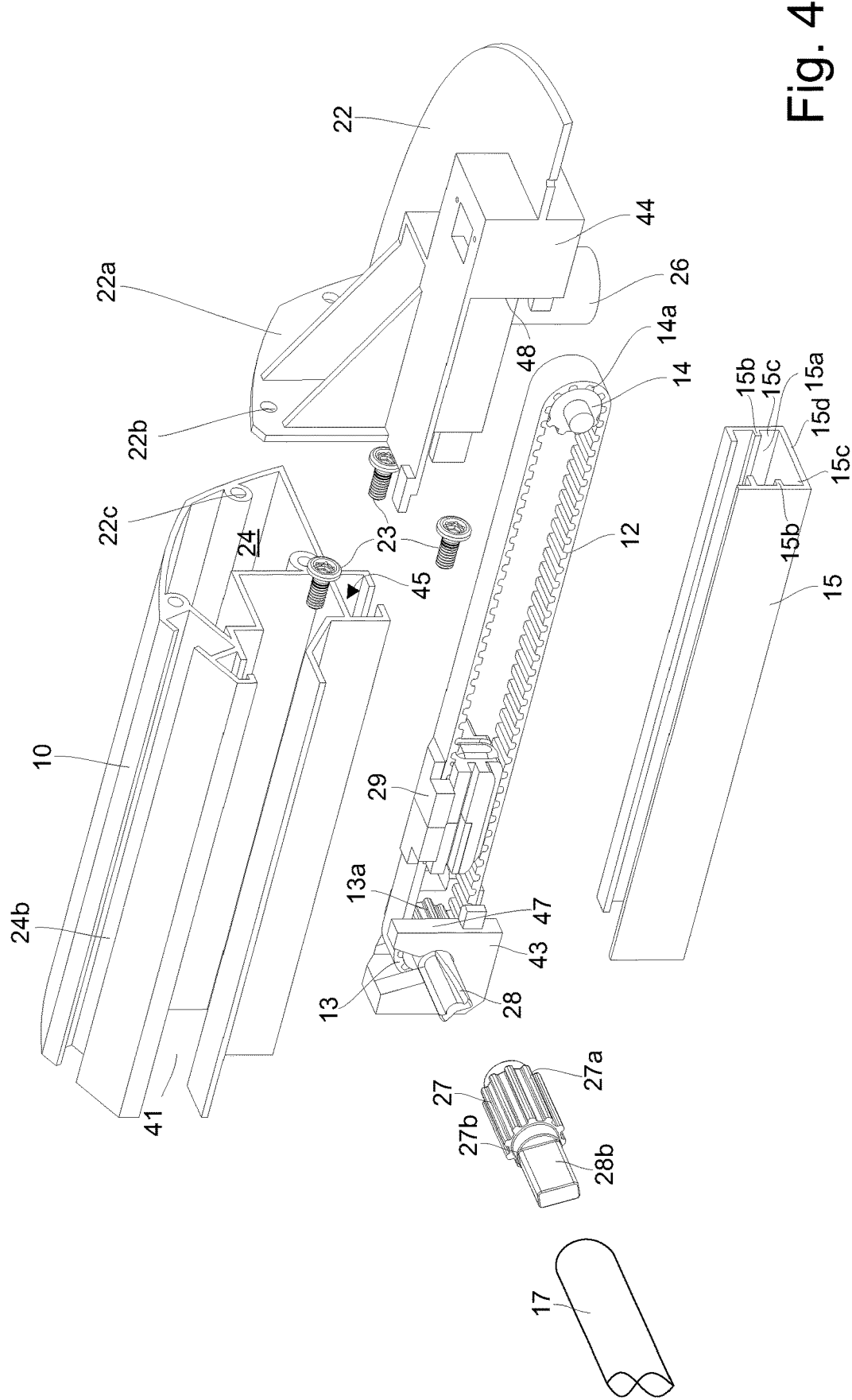

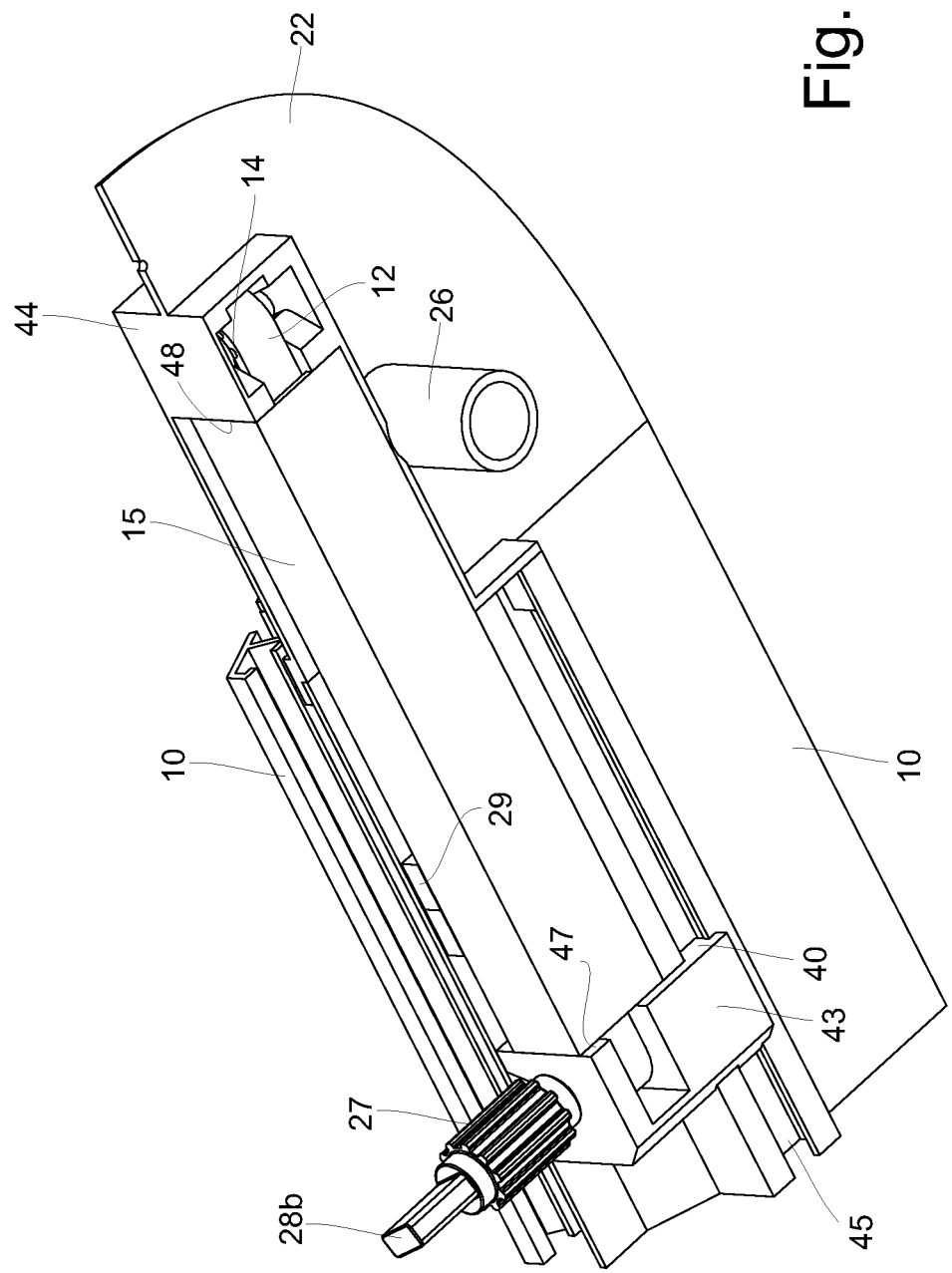

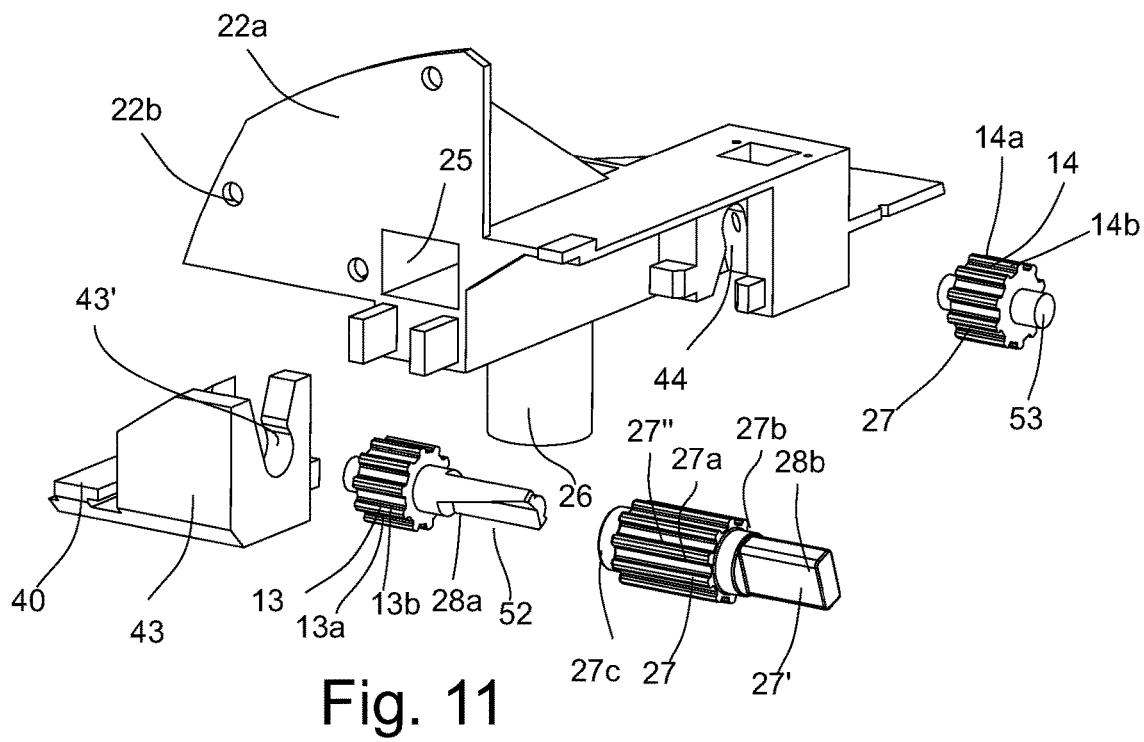
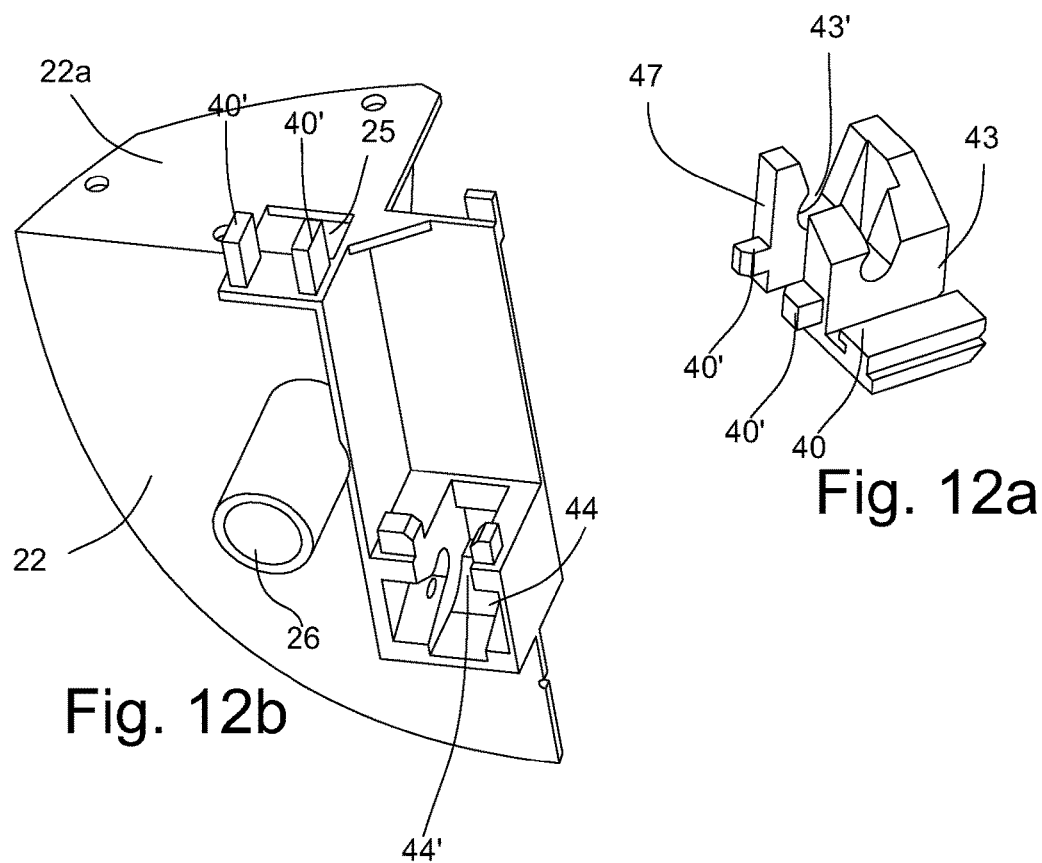
Fig. 11
Fig. 12a
Fig. 12b

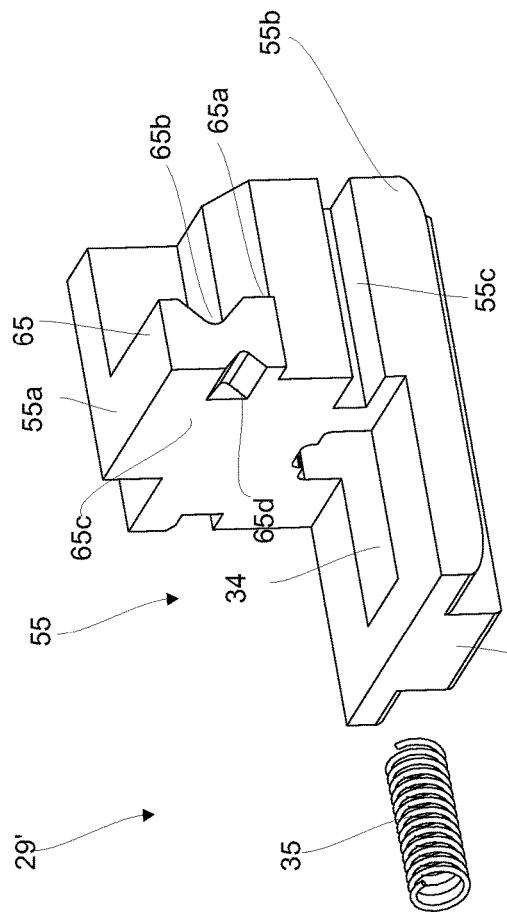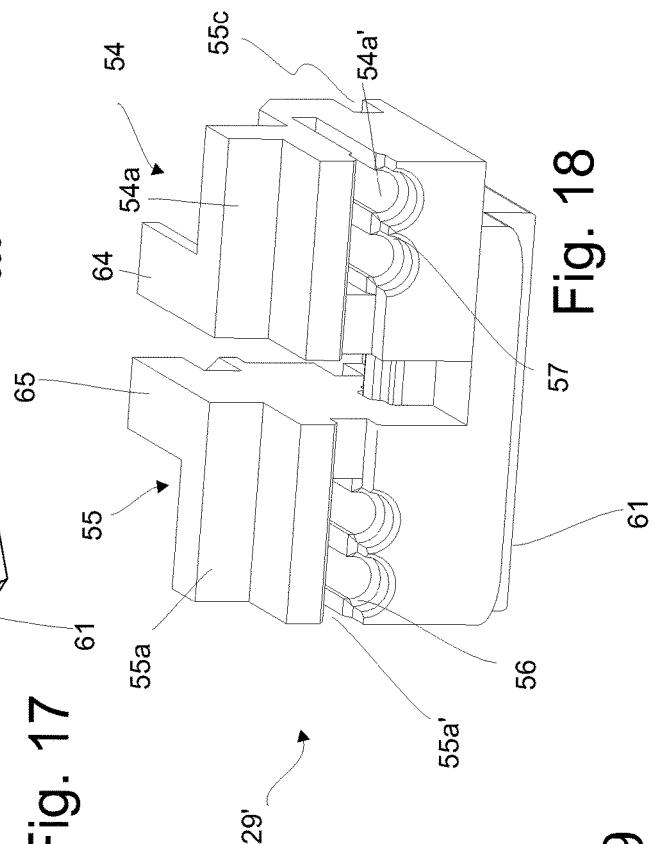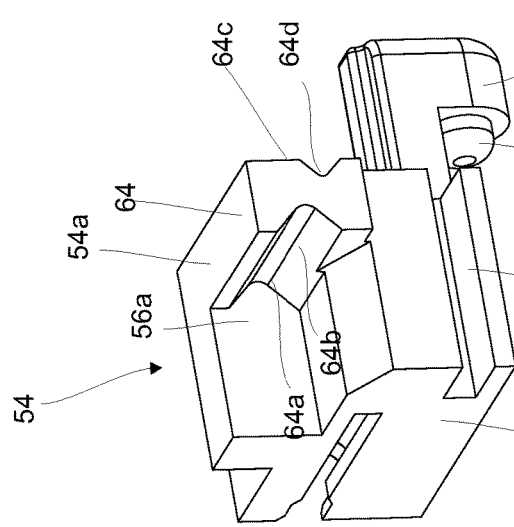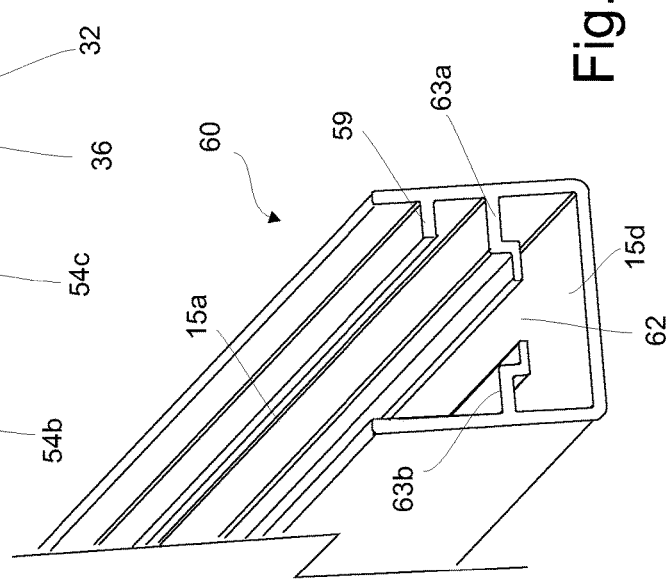

DRIVE SYSTEM AND A TRUCK BED COMPRISING A ROLL-UP TRUCK BED COVER AND THE DRIVE SYSTEM

This application is a 371 filing of International Patent Application PCT/DK2019/050125 filed Apr. 24, 2019, which claims priority to PA 2018 70246, filed Apr. 26, 2018.

TECHNICAL FIELD

The present invention relates to a drive system configured for reciprocating, between an extended position and a retracted position, a roll-up truck bed cover above a truck bed, said roll-up truck bed cover being composed of a rear profile, a plurality of elongate slats that are hinged together wherein the plurality of elongate slats has a foremost front slat, said drive system comprising at least one reciprocating means adapted for reciprocating the roll-up truck bed cover, and at least one reversible electric motor adapted for driving the reciprocating means.

BACKGROUND

Truck bed covers of the above-mentioned kind for converting an open bed of a pickup truck to a closed bed, and vice versa, are well known. When the truck bed cover is in its extended position closing the truck bed, it protects the content in the truck bed from bad weather and from unintentional access. In addition, a truck bed cover ensures that goods placed in the truck bed are not lost while driving the pickup truck. When the truck bed cover is in its retracted position opening up the truck bed larger objects may be transported with the pickup truck.

From U.S. Pat. No. 5,040,843 such a roll-up truck bed cover is known which is moved between an extended position and a retracted position by means of two drive wheels mounted on a motor driven shaft. The drive wheels physically engage the linkage between adjacent slats of the roll-up truck bed cover. So each time the roll-up truck bed cover is operated a linkage between adjacent slats is subjected to the heavy action of the drive wheels whereby the drive mechanism quite quickly will be worn, as both the notches in the drive wheels and the engaging depending portions on the roll-up truck bed cover are subjected to repeated mechanical impacts. Thus, clearance will occur rather rapidly in the cooperating parts, whereby their function becomes uncertain. Further, after prolonged operation of this known roll-up truck bed cover, the depending portions of the cover, which are constituted by the hinged parts of the cover, may become so worn that the slats of the cover can no longer rotate freely relative to each other, and furthermore the slats of the cover can be damaged so that the cover becomes leaky.

From US 2017/0341494 another pickup truck bed cover system is known, where the cover is a flexible, soft cloth, which may be wrapped on and off a driven main roller. The system involves a cable system for extending and retracting the cover by means of a motor. The cable system comprises a cable, which is wrapped about a motor driven drum and a number of idle pulleys, where the front part of the cover is secured to the cable. The cover may be moved in either direction by rotating the drum and thus moving the cable over the drum and pulleys. One disadvantage of the known cover system is that if the cover is subjected to a certain load, the cable will slide relatively easily on the drum and the pulleys so that the cable and thus the cover will not move in the desired direction. If this occurs, the cable as well as the drum and pulleys will become worn and the cable may break. A further disadvantage of this known system is the large number of gears used to transfer the power from the motor to the drum and thus the cable. The gears will become soiled relatively easily in the environment they are in, and thus be worn and cause malfunction.

In addition, the cable may pose a potential danger that a person who has an errand in the truck bed will cut on the cable, if it is not properly shielded. Furthermore, the cable system and the main roller should be properly synchronized as they cooperate to retract and extend the flexible cover, where just a slight asynchronicity may result in a too loose cover or a too tense cover. Yet a disadvantage is that the cover can curl if it does not get properly wrapped on the main roller.

SUMMARY OF THE INVENTION

The present invention aims to provide and improvement to the prior art roll-up truck bed covers.

In a main aspect of the present invention is provided a drive system of the kind mentioned in the opening paragraph with an increased reliability compared to conventional drive systems.

In a further aspect is provided a drive system of the kind mentioned in the opening paragraph, wherein the slats of the roll-up truck bed cover are exposed to much less wear as compared to known drive systems.

In a further aspect is provided a drive system of the kind mentioned in the opening paragraph, which provides a very precise and controlled movement of the roll-up truck bed cover.

In a further aspect is provided a drive system of the kind mentioned in the opening paragraph, which can be mounted to the truck bed with minimum tools and minimum alteration of the truck.

In a further aspect is provided a drive system of the kind mentioned in the opening paragraph, which does not need modification of the slats of the roll-up truck bed cover.

In a further aspect is provided a drive system of the kind mentioned in the opening paragraph, which has a mechanism for decoupling the truck bed cover from the electric drives system.

In a further aspect is provided a drive system of the kind mentioned in the opening paragraph, which has reciprocating means including pulley systems at opposite sides of the truck bed.

In a further aspect is provided a truck bed comprising the drive system of the kind mentioned in the opening paragraph.

The novel and unique whereby these and other aspects are achieved according to the present invention consist in that the at least one reciprocating means comprises at least one pulley system comprising at least one set of pulleys and at least one drive belt, which at least one set of pulleys includes a driven pulley and an idle pulley, and the drive belt is secured to the rear profile of the roll-up truck bed cover.

Within the scope of the present invention a "driven pulley" is to be understood as a pulley that drives a drive belt.

Within the scope of the present invention an "idle pulley" is to be understood as a loose pulley opposite the driven pulley to tighten and guide the drive belt. Thus the idle pulley is a free rolling or spinning pulley that provides a tension point.

Within the scope of the present invention a "drive belt" is to be understood as a continuous band of tough flexible material for transmitting motion.

Within the scope of the present invention a "roll-up truck bed cover" is to be understood as a lid that covers the bed of e.g. a pickup truck. The lid is assembled of elongate slats that are hinged alongside together, such as parallel to each other, to allow the lid to be rolled up. The roll-up truck bed cover of hinged slats is terminated at the tail gate by a rear profile and oppositely, at the driver's cab, by a front slat. The slats of the lid may be made in aluminum, plastic or any other suitable material, and a corresponding gasket or sealing may be provided at the linkage between two adjacent slats to keep rain from entering a potential gap at the linkage.

Within the scope of the present invention the term "front slat" means the slat closest to the driver's cab, thus the last slat of the roll-up truck bed cover when seen from the tail gate. Thus the front slat is the first slat to be rolled-up when the truck bed cover is retracted, e.g. to be stored in a container, such as a canister.

Soft cloth covers are not part of the present invention as roll-up truck bed covers but components of the present drive system can be used with soft flexible covers as well.

By reciprocating the roll-up truck bed cover by means of a drive belt which is wrapped around at least one set of pulleys is obtained a very reliable system for reciprocating the roll-up truck bed cover between an extended position and a retracted position. No moving parts of the reciprocating means slide or roll over the roll-up truck bed cover, which is therefore exposed to minimal mechanical wear. Further, as the slats of the roll-up truck bed cover are not exposed to mechanical impacts or twists during its reciprocating movement no clearance or play due to wear will occur between the slats, thus the function of the slats is stable, where the slats constantly will remain freely hinging and rotatable relative to each other. During normal operation, no damage will occur to the slats of the roll-up truck bed cover allowing it to leak.

By using a drive belt for providing the reciprocating movement of the roll-up truck bed cover a very good contact surface between the drive belt and the pulleys is obtained, which entails that the drive belt will not slide on the pulleys, but will instead ensure that the roll-up truck bed cover will move perfectly with the drive belt without any slip. This will minimize the wear of the drive belt as well as of the pulleys, thus extending the life of these parts, especially avoiding breaking the drive belt. Further, as the drive belt is secured to the rear profile of the roll-up truck bed cover a very consistent and reliable movement of the roll-up truck bed cover is obtained without resulting in a too loose cover or a too tense cover. Yet an advantage is that a drive belt is inexpensive and easy to replace.

In one embodiment the drive system may comprise two opposite pulley systems, one at each long side of the truck bed, and a shaft connecting the corresponding driven pulleys of each pulley system to each other, which shaft is arranged rotatable about its axis by the electric motor. Thereby is ensured that the roll-up truck bed cover is driven equally on both sides thereof, so that any twisting or distortion of the roll-up truck bed cover is completely avoided and the roll-up truck bed cover can reciprocate smoothly and easily. It is thus avoided that the slats of the roll-up truck bed cover are bent or pulled askew, so that the roll-up truck bed cover may leak or otherwise lose its intended purpose. By providing the two opposite pulley systems with one and the same shaft for rotating the driven pulleys it is ensured that the roll-up truck bed cover is drawn in the extended and the retracted position, respectively, synchronously at exactly the same speed at both sides of the roll-up truck bed cover. Hereby, the wear on the slats of the roll-up truck bed cover will be minimal and its lifetime significantly extended.

The drive belt may be constituted by any appropriate drive belt design, and thus the drive belt may be a flat belt, a V-belt, a multi-groove belt, a ribbed belt, a toothed belt or a timing belt. A flat belt is the simplest and also the cheapest belt, and is preferably used where the forces to be transferred are not so big and/or where a smaller slip can be allowed. A V-belt has a general trapezoidal cross-section shape and thus a somewhat larger drive surface, hence solving some of the slippage and alignment problems known from the flat belt. A multi-groove belt is usually made up of a number of V-shaped sections alongside each other, thus providing a thinner belt for the same drive surface. A ribbed belt is a belt featuring lengthwise grooves, and it operates from contact between the ribs of the belt and the grooves in the respective pulley. A timing belt, which also is known as toothed, notch, cog or synchronous belt, is a so-called positive transfer belt and can avoid relative movements, it has teeth that fit into a matching toothed pulley, so when correctly tensioned it have no slippage and runs at constant speed.

In one embodiment the drive belt has first teeth or first ribs, and the driven pulley and the idle pulley has second teeth or second ribs that engage the first teeth or first ribs. Hereby, the roll-up truck bed cover may be driven into its extended and retracted positions, respectively, in a very precise way involving no slippage and at constant speed. Thus, the wear on the slats of the roll-up truck bed cover will be reduced to an absolutely minimum. In addition, it will be relatively easy to lead and control the roll-up truck bed cover to any particular position between the fully extended position and the fully retracted position.

The drive belt may be of "endless" design of a predetermined length, however, in one embodiment, the drive belt may be a length of toothed or ribbed belt or strip having a first free end and an opposite second free end, which first free end and second free end may be assembled into a loop by means of a resiliently extensible belt tensioner, which resiliently extensible belt tensioner has third teeth or third ribs configured for engaging the first teeth or first ribs of the drive belt. A drive belt sold by the meter may be used, which is often considerably cheaper than an endless drive belt sold in predetermined lengths, and furthermore a drive belt of any length can be obtained and customized on demand. Hereby, the drive system may be adapted to any size of the truck bed, and should the drive belt slack it can be shortened as required. Yet and advantage is that a drive belt with certain elasticity, and thus certain stretchability, can be achieved with the resiliently extensible belt tensioner, which ensures that a certain tension is always present in the drive belt. Hence, slippage between the drive belt and the pulleys will be substantially eliminated and the drive belt be kept stretched irrespective of whether the roll-op truck bed cover is extended or retracted.

The resiliently extensible belt tensioner may be constituted by any suitable tensioner, however, in one embodiment the resiliently extensible belt tensioner comprises a first part having a projecting L-shaped portion or claw and a second part having a groove or recess for accommodating the L-shaped portion or claw of the first part, and a spring placed in the groove or recess and abut against a first surface of the first part and a second surface of the second part, respectively. In this way a very simple and compact resiliently extensible belt tensioner is obtained, that provides the drive belt with a required tension, so that good contact between the drive belt and the pulleys can be maintained. This means that slippage between the drive belt and the pulleys can be avoided or at least reduced.

In an expedient embodiment of an resiliently extensible belt tensioner the first part may have a first top part and a first bottom part, which first top part may have a lateral first protrusion for engaging an intermediate component provided on the rear profile, and the second part may have a second top part and a second bottom part, which second top part may have a lateral second protrusion for engaging the intermediate component. The engagement between the lateral protrusion and the intermediate component advantageously serve to move the truck bed cover along with the motion of the drive belt, when said drive belt is run by the electric motor.

The intermediate component may have protruding legs to engage the respective lateral protrusions. Preferably the distance between the protruding legs are larger than the distance between the lateral protrusions, so that the engagement between a pair of a lateral protrusion and an opposite leg typically takes place in alternating manner, depending on whether the roll-up truck bed cover is moved open or closed, and on the tensioning of the drive belt. Thus when one pair of a lateral protrusion and an opposite leg is engagement the other pair is not.

The drive belt may extend freely exposed to the surroundings of the truck bed, however in one embodiment the reciprocating means may comprise an elongate guide profile with an elongate guide track that accommodates at least the majority of the length of the drive belt between the driven pulley and the idle pulley. In addition, the reciprocating means may comprise bracket bearings for the driven pulley and the idle pulley, respectively, at or in the vicinity of opposite ends of the elongate guide track. In this way, the drive belt can be protected from being hit and possibly damaged by items placed in the truck bed. Similarly, a user of the truck is prevented from striking against the drive belt during its movement and thereby being injured. Further, the drive belt will run smoothly on the pulleys placed in bracket bearings over the full length of the elongate guide track. Hereby, the forces needed to move the roll-up truck bed cover are minimized.

Furthermore, the elongate guide track may be configured to suspend and control the reciprocating motion of the resiliently extensible belt tensioner, for example by utilizing a slide foot of the resiliently extensible belt tensioner to slide in the elongate guide track.

The driven pulley of the sets of pulleys of the pulley system may be driven via a motor drive belt directly on the shaft of the driven pulley. However, in one embodiment the roll-up truck bed cover reciprocating means includes a shaft pulley driven about its rotation axis via a motor drive belt by the electric motor, which shaft pulley may have a first shaft pulley end secured to the driven pulley and an opposite second shaft pulley end secured to the shaft that extends to connect the driven pulleys of opposite drive systems. In the alternative the shaft pulley can simply be an extension of the driven pulley, so that both the motor drive belt and the drive belt directly drive the same pulley. The advantage of having a separate shaft pulley is however that the drive system can more easily be fitted and customized. So the sets of pulleys of the pulley system can be standards, and depending on the selected electric motor, its transmission, kind of motor drive belt, the weight of the roll-up truck bed cover, etc, the shaft pulley can be freely chosen provided it can couple to the driven pulley. So the shaft pulley can be ribbed or smooth to engage a complementarily ribbed or smooth shaft pulley.

The roll-up truck bed cover may be reciprocatingly secured to the truck bed by means of coupling rails mounted to the sidewalls of the truck bed. The coupling rails may be of the kind adapted for mounting on top of the sidewalls, adjacent to an upper edge of the sidewalls or more or less below an upper edge of the sidewalls. Advantageously a drive system can be pre-assembled with a coupling rail so as to be mounted as a combined unit, e.g. at the factory, to allow easy fitting on the truck bed. A drive system and a coupling rail can however in the alternative be mounted as separate units.

The drive system may comprise any appropriate means for collecting the roll-up truck bed cover during its retracting, such as a rotating shaft contained in an elongate canister.

A canister may have a lid and the roll-up cover be retracted inside the canister below the lid with the front slat being the leading slat to enter the canister. The guide profiles may be detachable or not detachable coupled to the canister.

In one embodiment the drive system may comprise an elongate canister for collecting the roll-up truck bed cover during its retracting, which canister may have opposite first and second spiral-curved guide channels at opposite short ends of the canister, which opposite first and second spiral-curved guide channels may be configured to receive a free edge of the roll-up truck bed cover during its rolling up upon retracting. In this way, the slats of the roll-up truck bed cover will not impact each other and rub against each other during the movement of the roll-up truck bed cover between the retracted and the extended position and vice versa. Thus, the wear of the slats of the roll-up truck bed cover will be reduced to a minimum. Moreover, the slats of the roll-up truck bed cover will be treated very gently and not be subjected to impact or bumps that can scratch them or at worst bend them or make bulges or dents in them.

The invention also relates to a roll-up truck bed cover comprising a plurality of interconnected slats with the drive system described above. The roll-up truck bed cover has a rear profile provided at a rear end of the plurality of interconnected slats facing the tail gate of the truck bed, and a front slat provided at the opposite end of the plurality of interconnected slats.

The rear profile is secured to the drive belt, either directly or via an intermediate component that protrudes from the rear profile to engage a component of the reciprocating means. For example can the rear profile of the roll-up truck bed cover advantageously be secured to the drive belt via an intermediate component that protrudes from the rear profile to detachably engage an associated coupling component of the reciprocating means, e.g. the resiliently extensible belt tensioner, whereby the resiliently extensible belt tensioner becomes coupled to the rear profile to move the roll-up truck bed cover to open and close the truck bed.

The intermediate component may have various configurations, however in a preferred embodiment the intermediate component can be a connector that comprises a housing component and a connector component reciprocatingly arranged in the housing component to engage the associated coupling component of the reciprocating means.

The housing component can be hidden inside the rear profile by being inserted into the rear profile at a free end, and with the connector component reciprocatingly arranged in the housing component in order to be exposable from the housing component to engage the associated coupling component on the drive belt, to drive the truck bed cover open and closed, and to be retractable inside the housing component to disengage the resiliently extensible belt tensioner on the drive belt in case the electric motor malfunctions or the motion of drive system stops unintentionally, or if maintenance or repair is to be performed.

The connector thus not only serves to carry the truck bed cover along when the drive belt rotates, the connector also serves as a safety mechanism to release the roll-up truck bed cover from the drive system.

Such disengagement can be done manually from inside the truck bed cover even in the accidental situation where the roll-up truck bed cover is fully closed and cannot be opened using the electric motor, or in any intermediate position of the roll-up truck bed cover between open and closed. After disengagement the roll-up truck bed cover can be manually pushed towards the canister or pulled towards the tailgate.

To facilitate the engagement and the disengagement procedure the housing component may comprise a securing end part adapted for being inserted into the free end of the rear profile and being configured as a tray for accommodating the connector component, which securing end part may comprise a tray bottom wall, a first tray end wall facing towards the drive belt, an opposite second tray end wall, and opposite tray side walls extending between the first tray end wall and the second tray end wall, the first tray end wall has a first tray opening, and the tray bottom wall has a second tray opening.

A housing component having such a shape and configuration can easily be inserted axially from the free end of the rear profile to be, at least substantially, hidden inside the rear profile.

A connector component can then be arranged in the housing component to slide along the tray bottom wall between the first tray end wall and the opposite second tray end wall guided by the opposite tray side walls. An advantageous connector component may comprise a fork or bifurcation aligned with the first tray opening to be exposed from a first connector end of a first connector end part of a main connector body of the connector component for engaging the belt tensioner. An opposite second connector end part of the main connector body of the connector component may have a second connector end that in the disengaged condition of the connector and belt tensioner can be retracted a maximum retracted length where it hits the second tray end wall.

The second connector end part can have a connector opening, wherefrom a finger grip protrudes out of the second tray opening in the assembled state of connector component and housing component to be grasped to reciprocate the connector component in and along the housing component. The finger grip makes it easy to reach and to grasp to operate and control the movement of the connector to disengage the connector component and the housing component.

In the embodiment wherein the connector is inserted into the rear profile the side of the rear profile that faces inside the truck bed has an operating opening aligned with the second tray opening to make the passage for the finger grip which allows the finger grip to protrude from the operating opening to be operated through the wall of the rear profile.

The drive system may have locking means to keep the connector and the belt tensioner, or similar coupling component, engaged in the operative state of the roll-up truck bed cover, which is the usual state the roll-up truck bed cover. Such means can e.g. be obtained by the connector component having a locking pawl to detachably engage a locking tooth of the housing component.

The drive system may also have synchronizing means to get two pulley systems of the reciprocating means system in synchronized aligned engagement after the opposite sets respective connector and belt tensioner have, for some reason been disengaged.

The part of the connector acting as the first part of the synchronizing means may include that the housing component has a third tray opening, and that the first connector end part has a curved face aligned with the third tray opening. A trigger rod can then be provided as the part of a second part of synchronizing means at the front end of the truck bed to move inside the third tray opening to displace the connector component by moving along the curved face thereby pushing the connector component towards the belt tensioner the closer the rear profile gets to the front end of the truck bed. The trigger rod or similar protruding actuator means can e.g. be provided on the canister. The length of the trigger rod serves to make the lateral movement of the connector component inside the connector housing whereby the connector component and the belt tensioner at opposite sides of the truck bed cover snaps together into aligned and synchronized engagement. Once the electric motor starts again the roll-up truck bed cover can function without running askew.

One set of connector and belt tensioner may be engaged first using the finger grip function. Then the electric motor can be operated to move the opposite set of connector and belt tensioner towards the front end of the truck bed, whereby the trigger rod enters the third tray opening of approaching connector and pushes the connector component laterally into engagement with the associated belt tensioner.

The present invention also relates to a truck bed comprising the roll-up truck bed cover described above.

Such a truck bed can easily be converted from an open bed of a pickup truck to a closed bed, and vice versa.

With reference to the drawing the invention will be described in further details by way of exemplary embodiments and a short functional model that illustrates the drive principle of the drive system. It should however be emphasised that the functional model is as long as needed to span the extended length of the roll-up truck bed cover from the driver's cab to the tail gate.

BRIEF DESCRIPTION OF THE DRAWING FIGURES

Figure 1B:
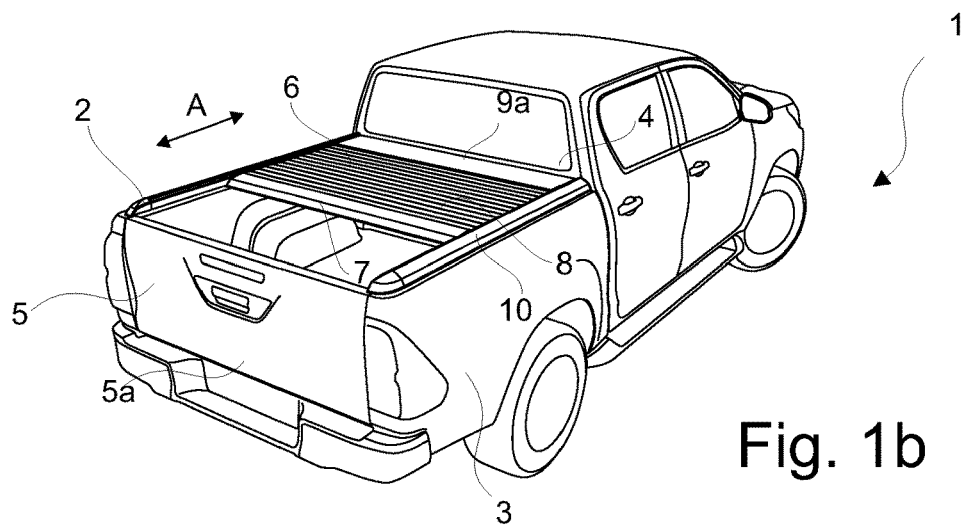
Figure 1C:
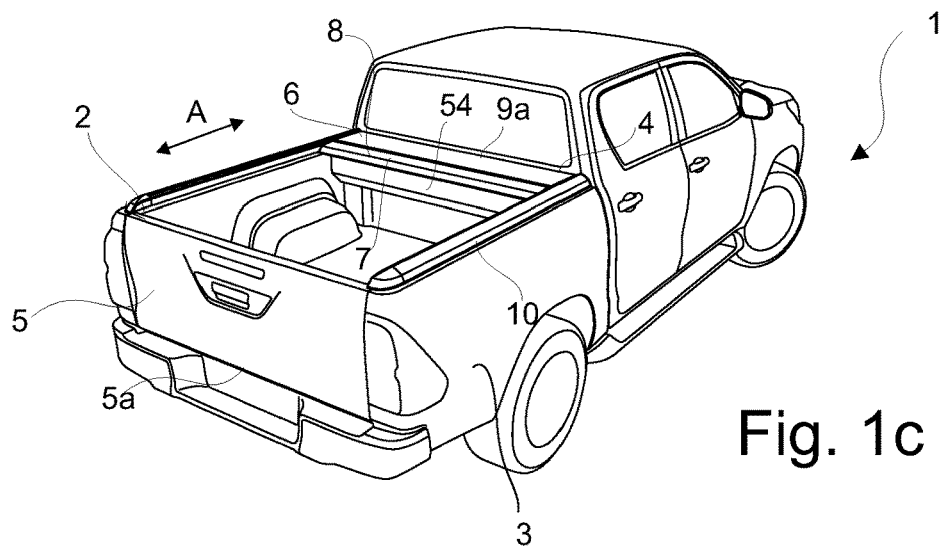
Figure 2B:
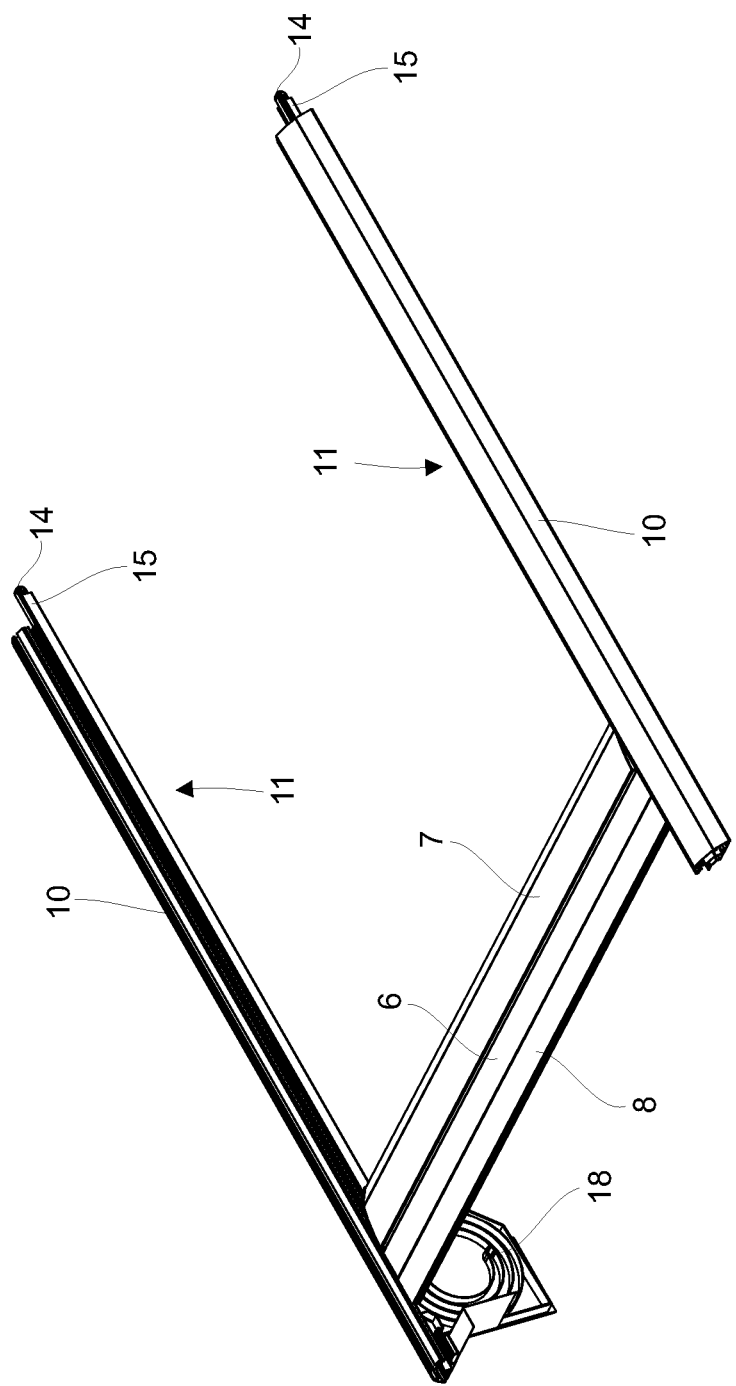
Figure 6:
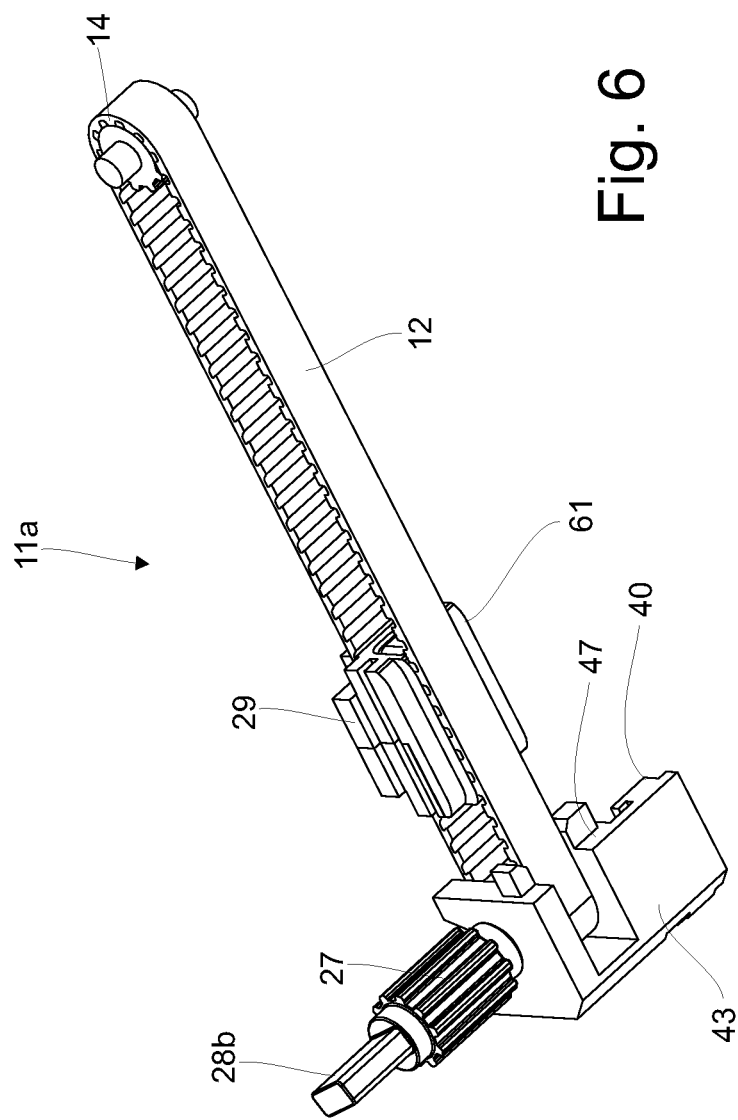
Figure 7:
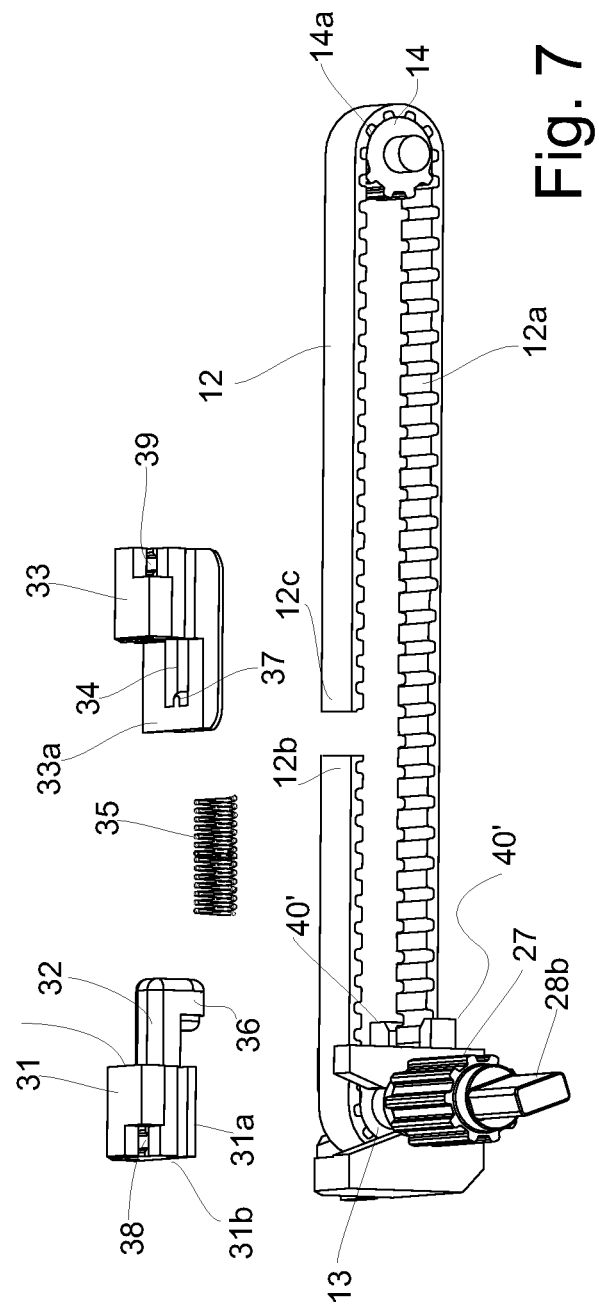
Figure 8:
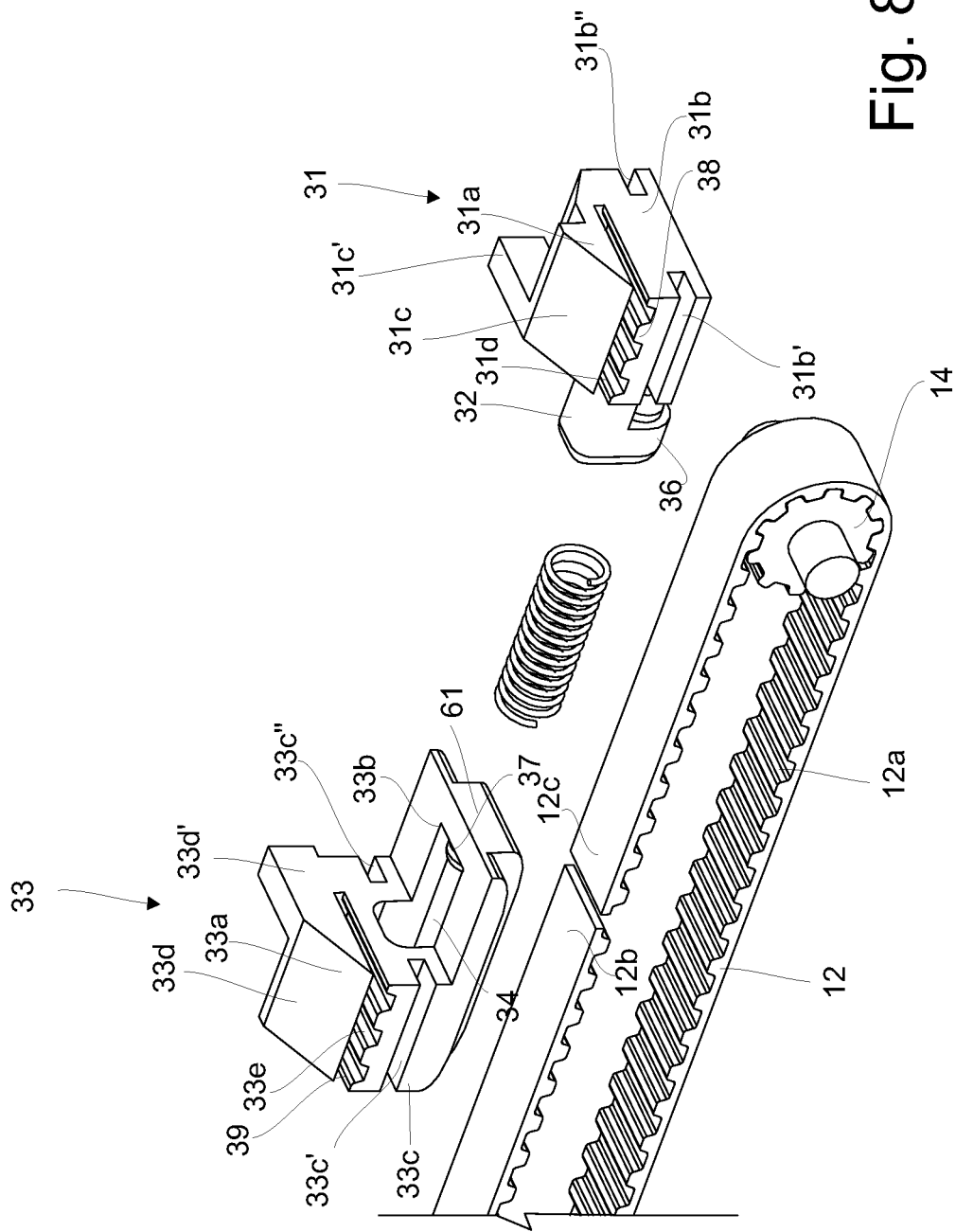
Figure 9:
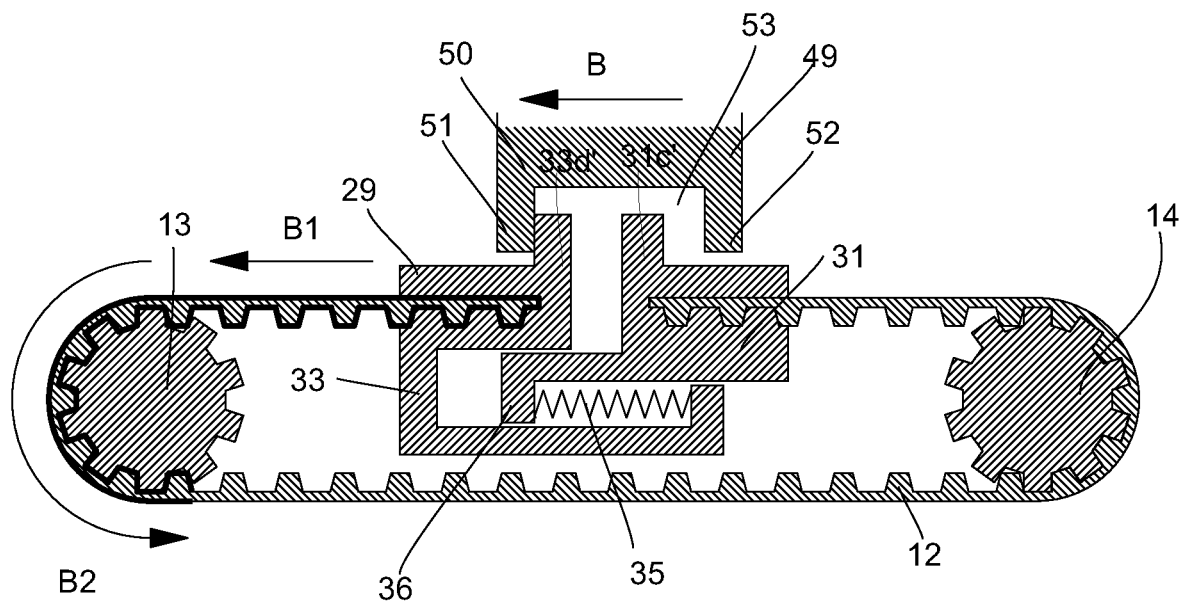
Figure 10:
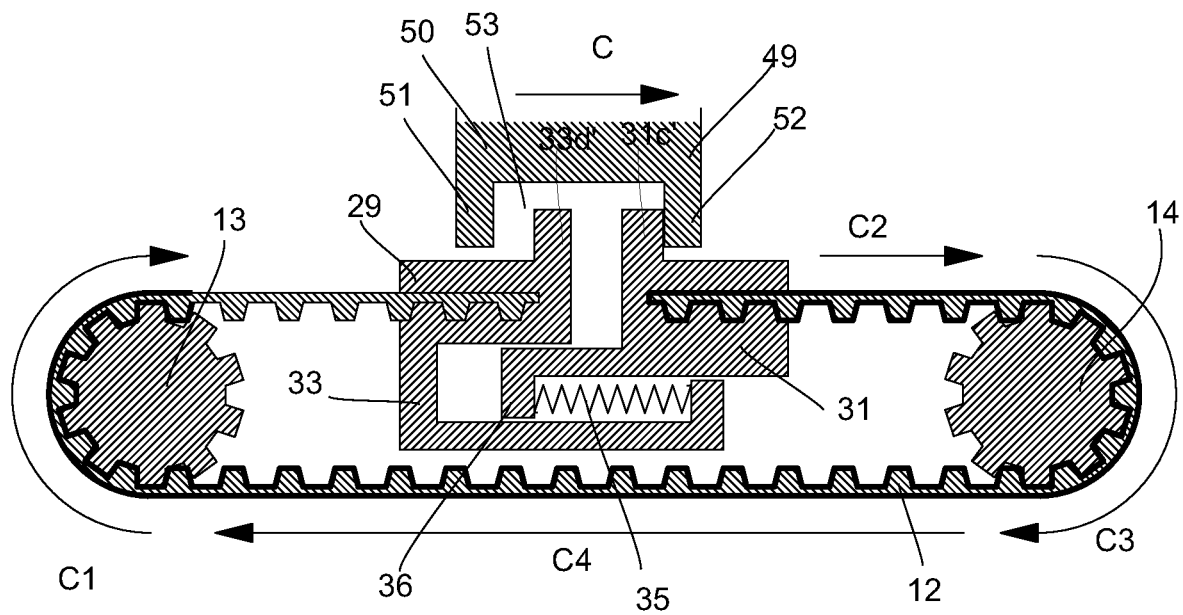
Figure 13:
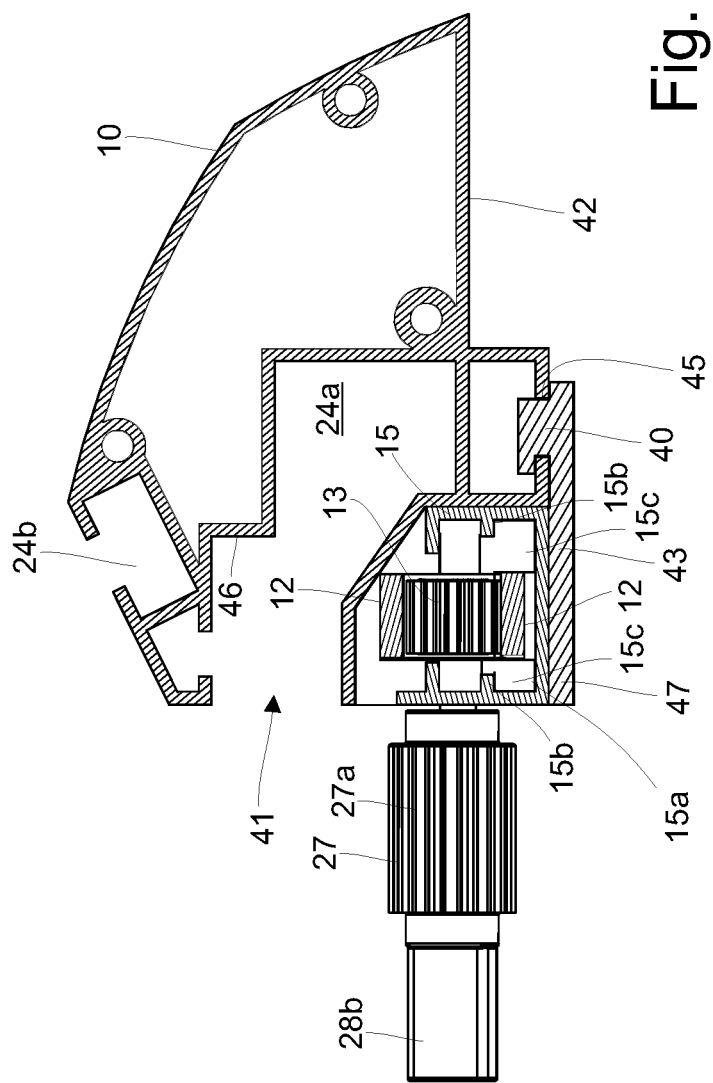
Figure 14:
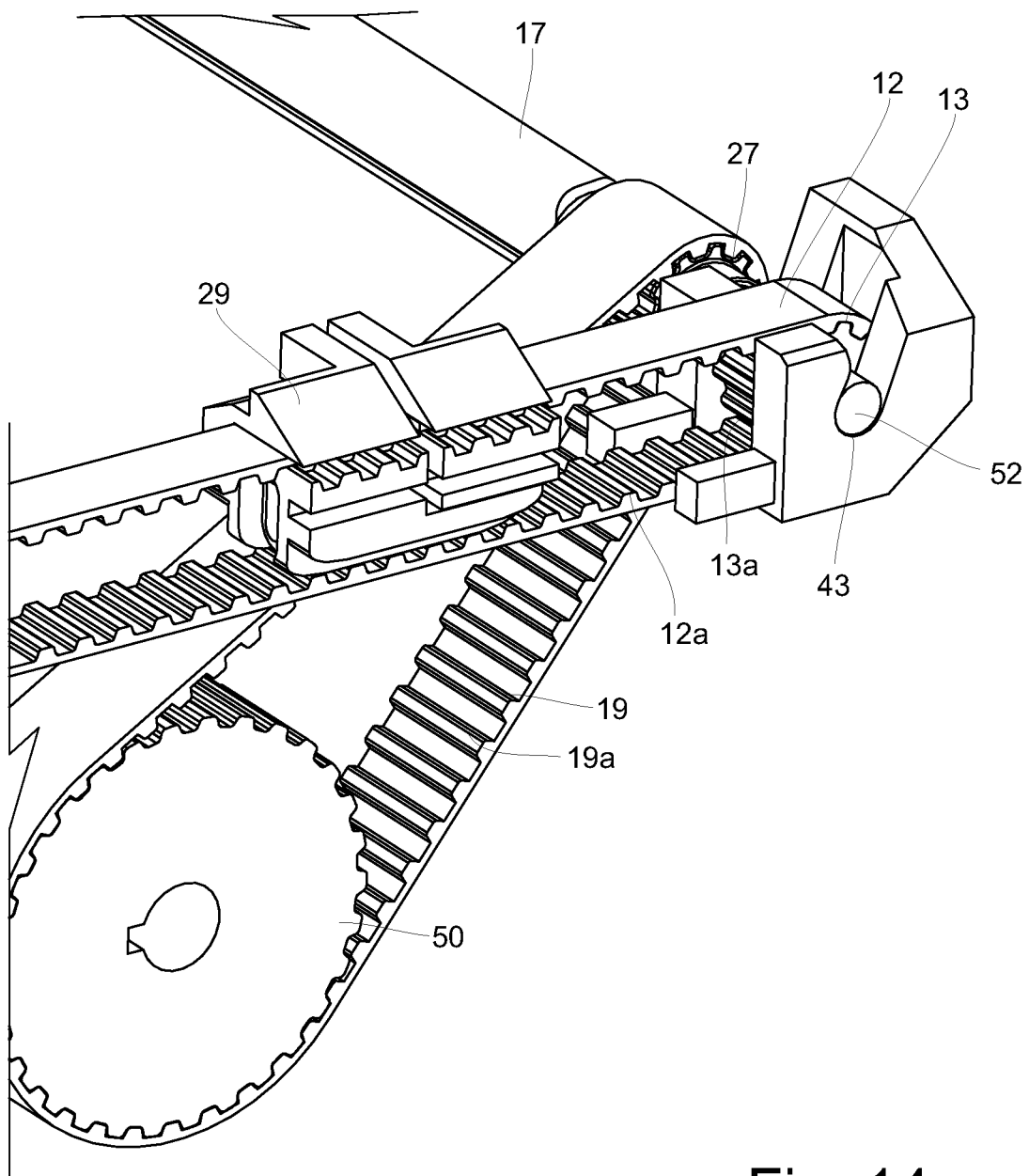
Figure 15:
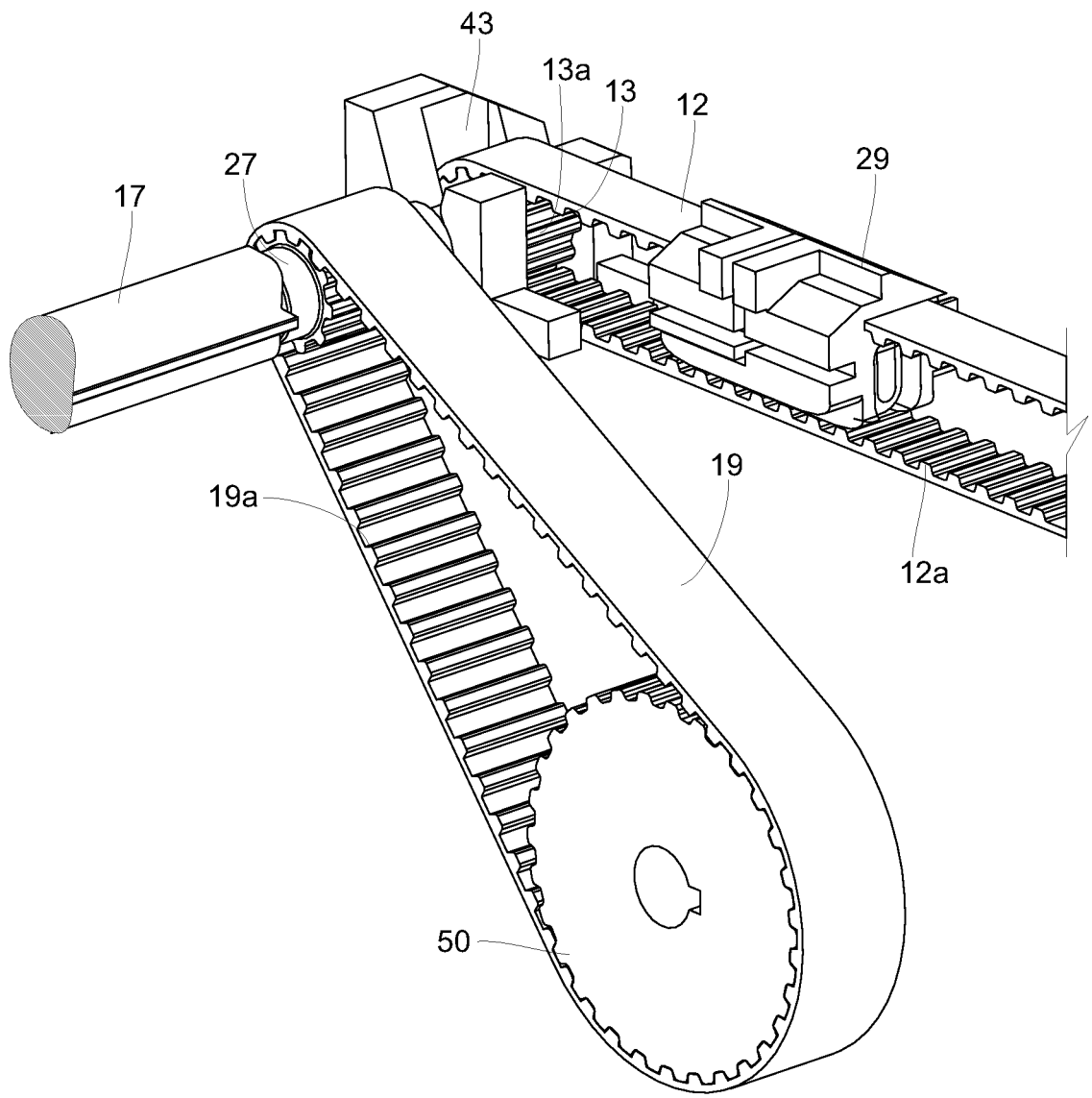
Figure 16:
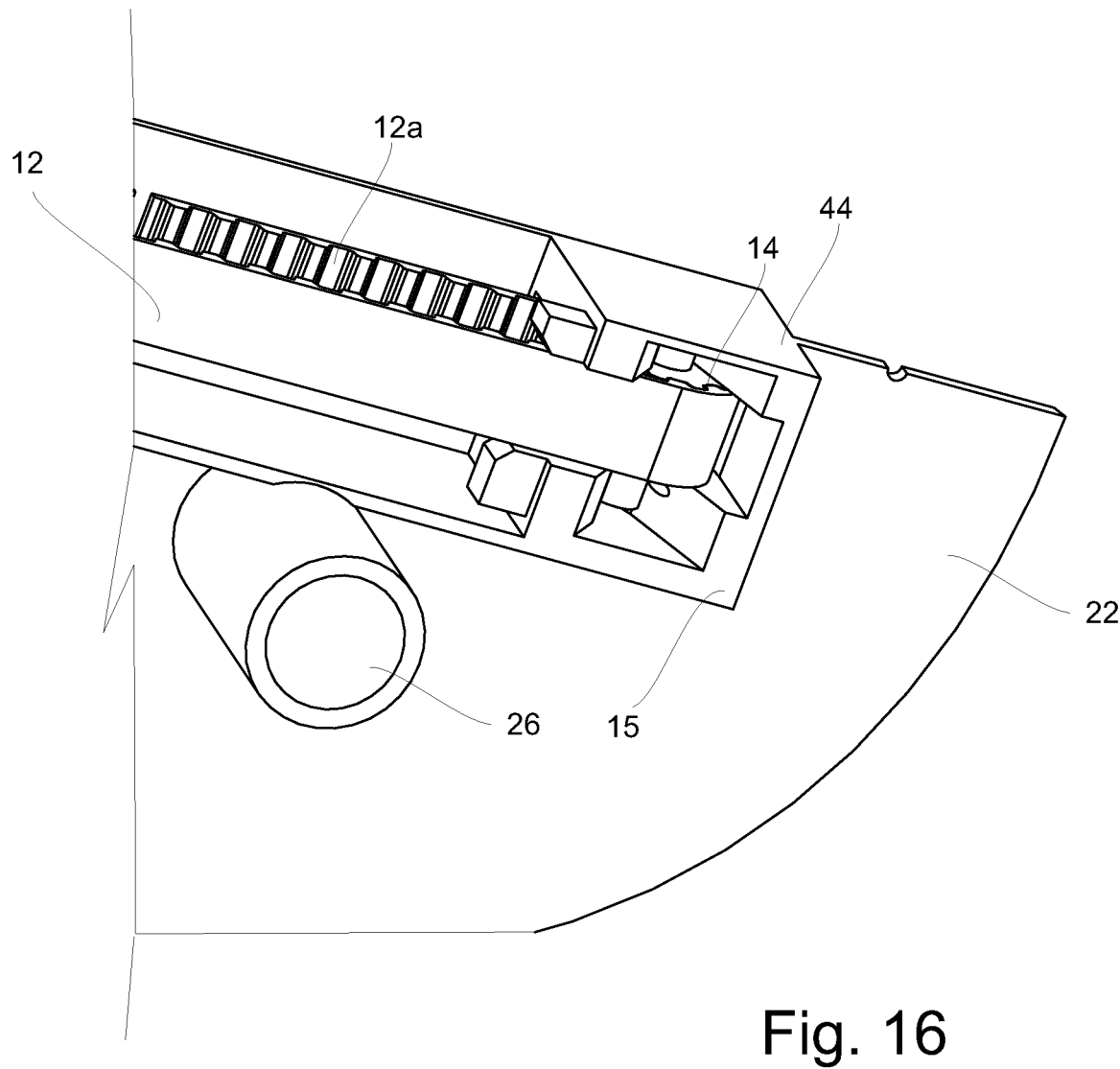
Figure 20:
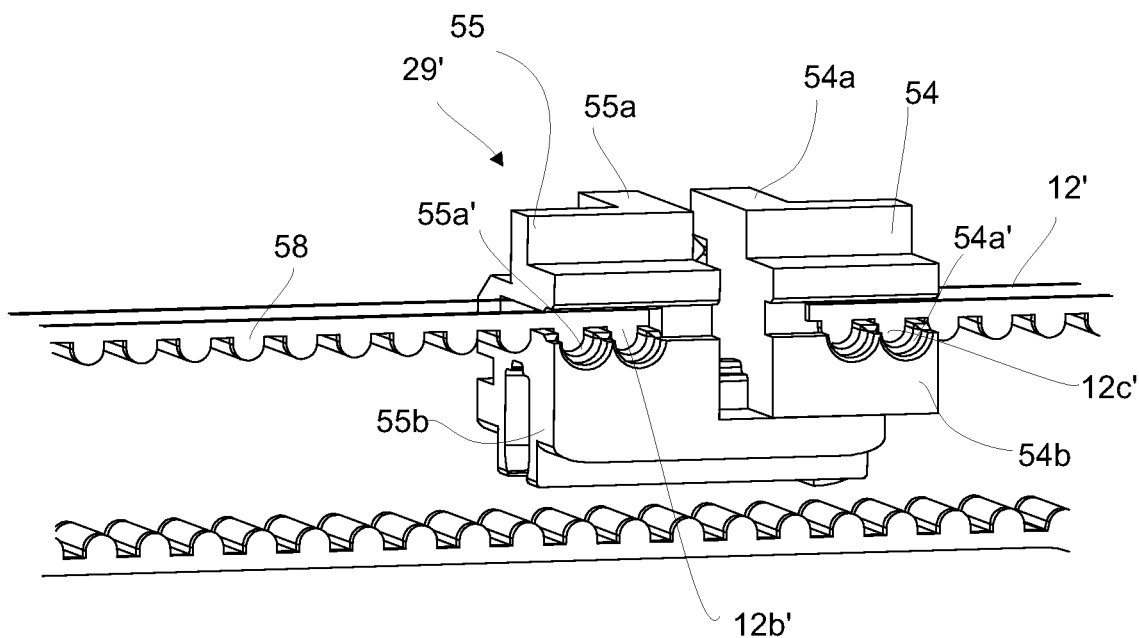
Figure 21:
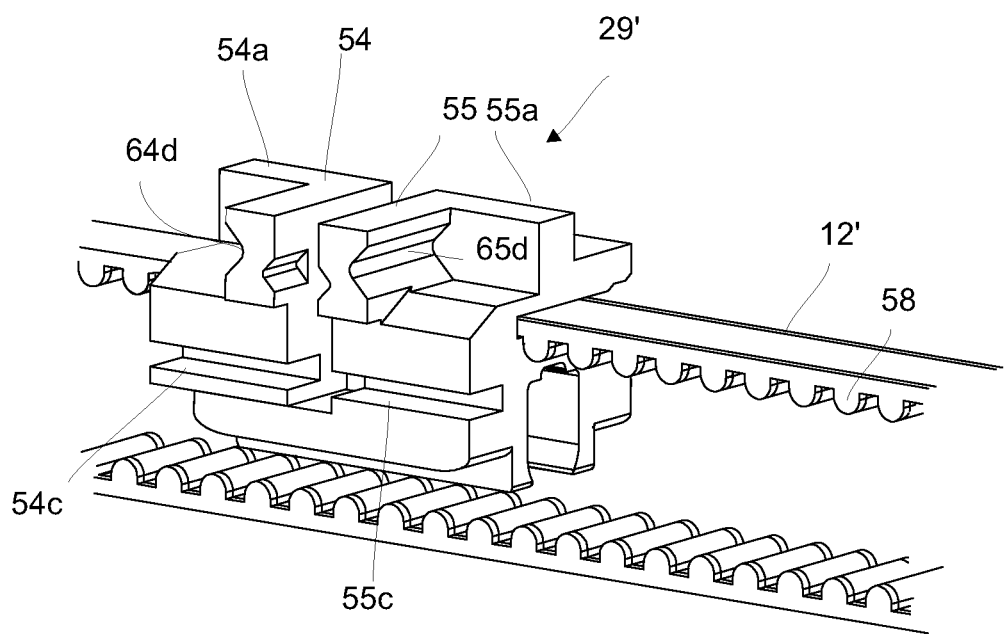
Figure 22:
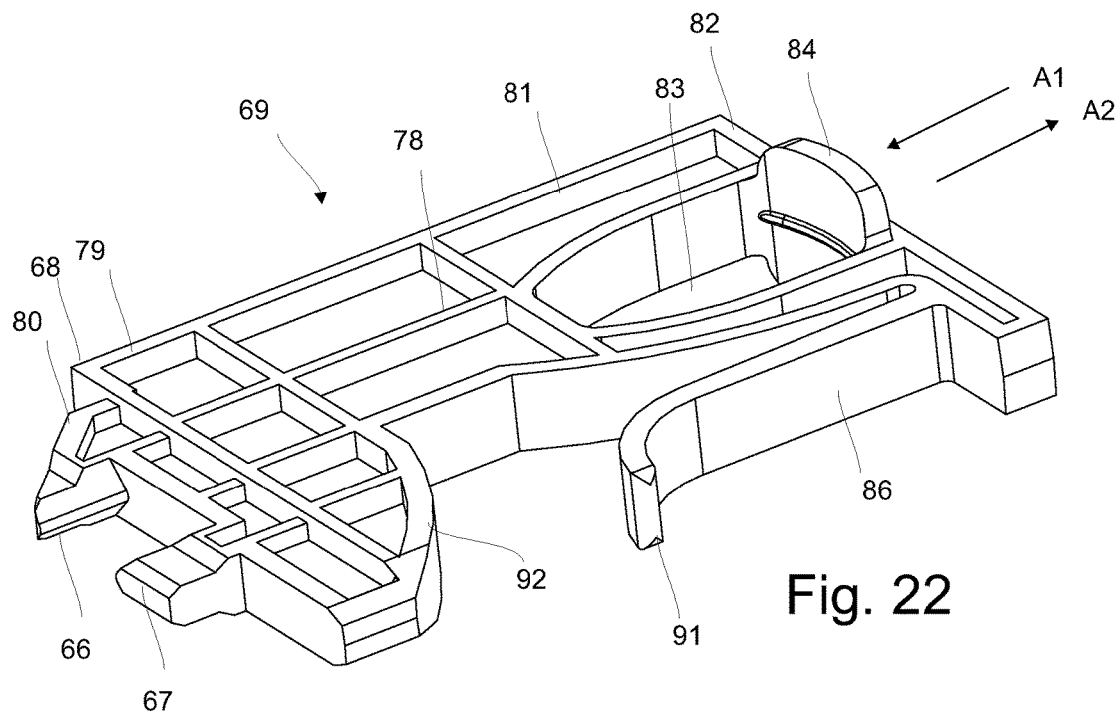
Figure 23:
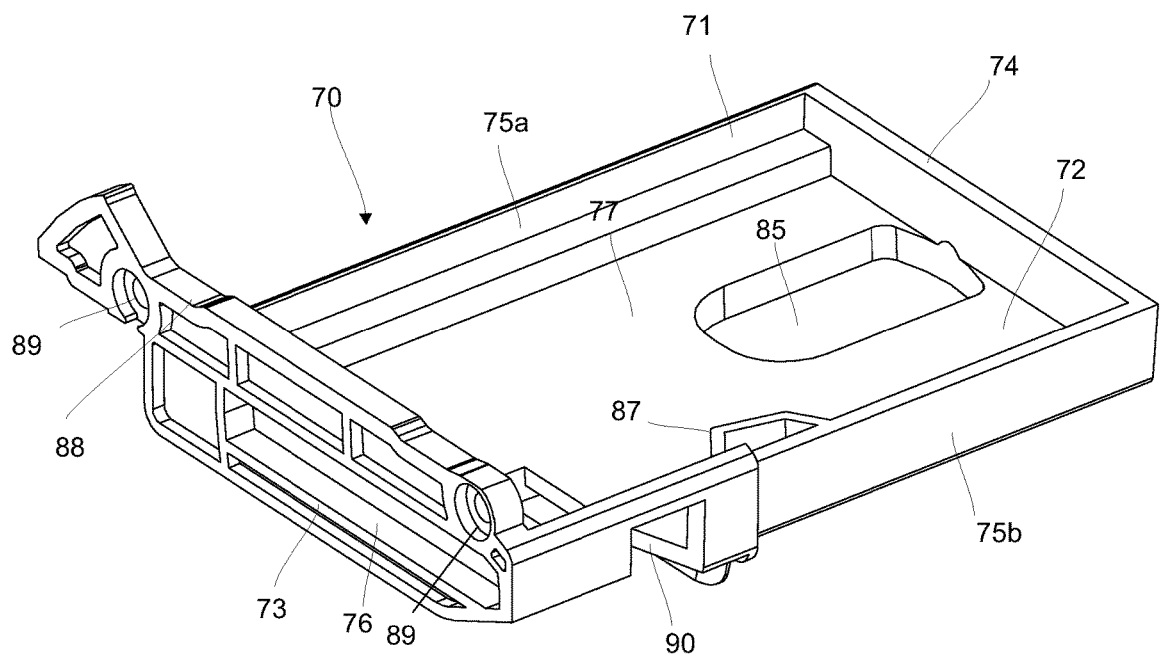
Figure 24:
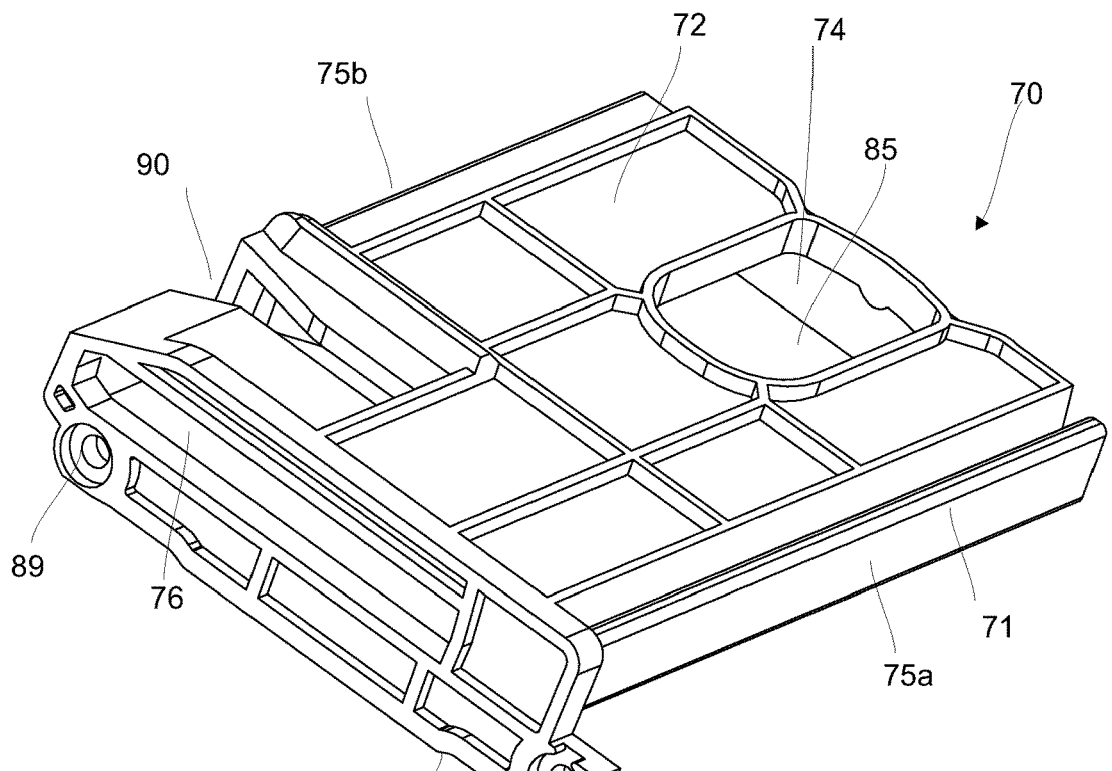
Figure 25:
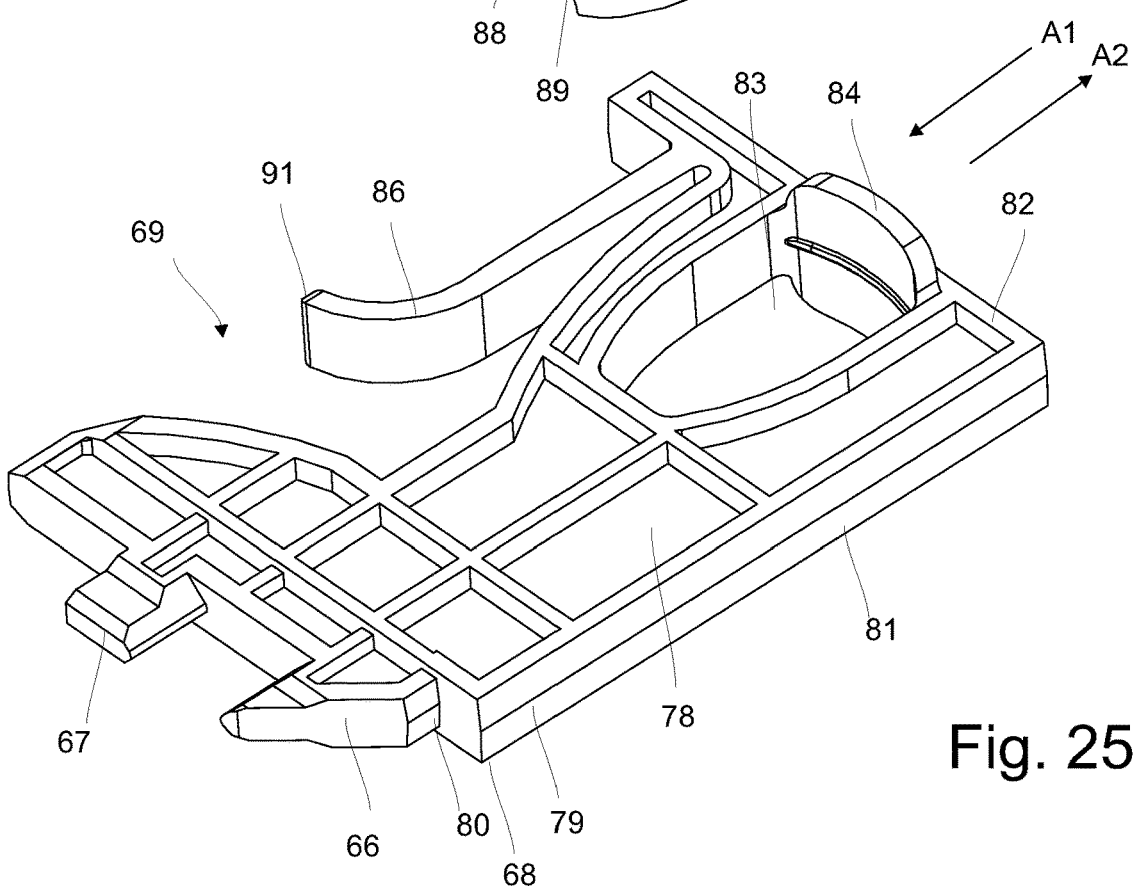
Figure 26:
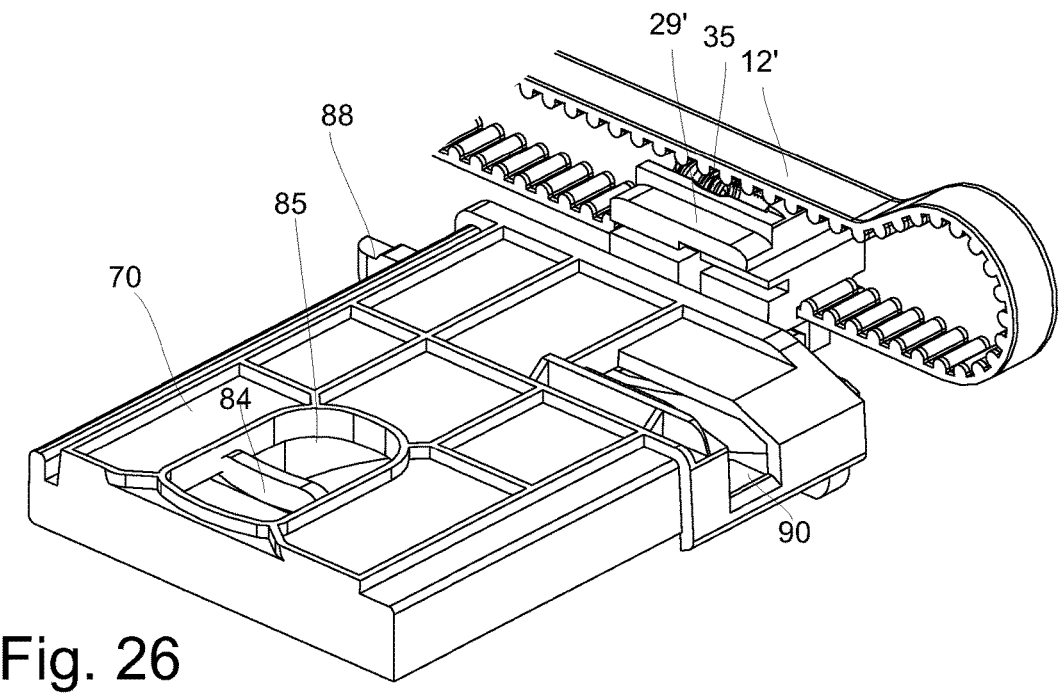
Figure 27:
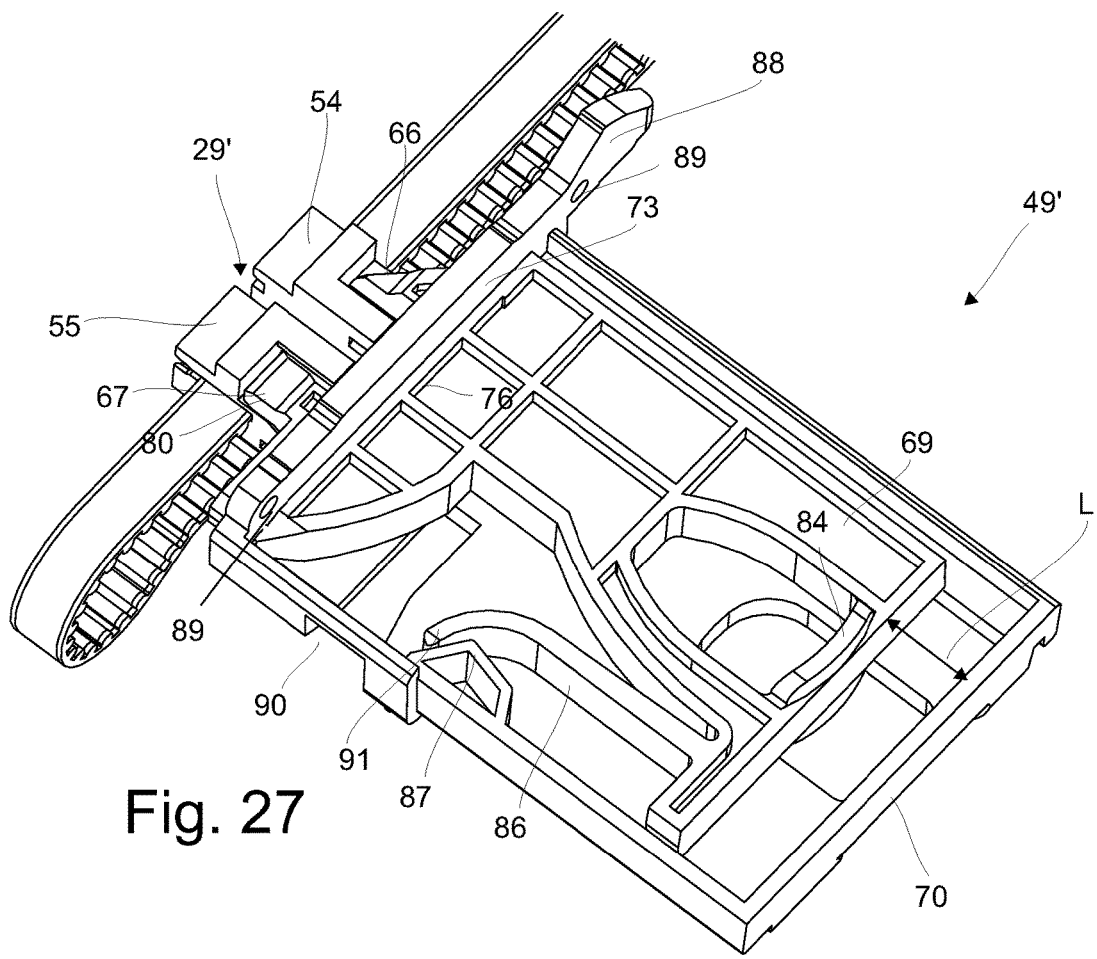
Figure 28:
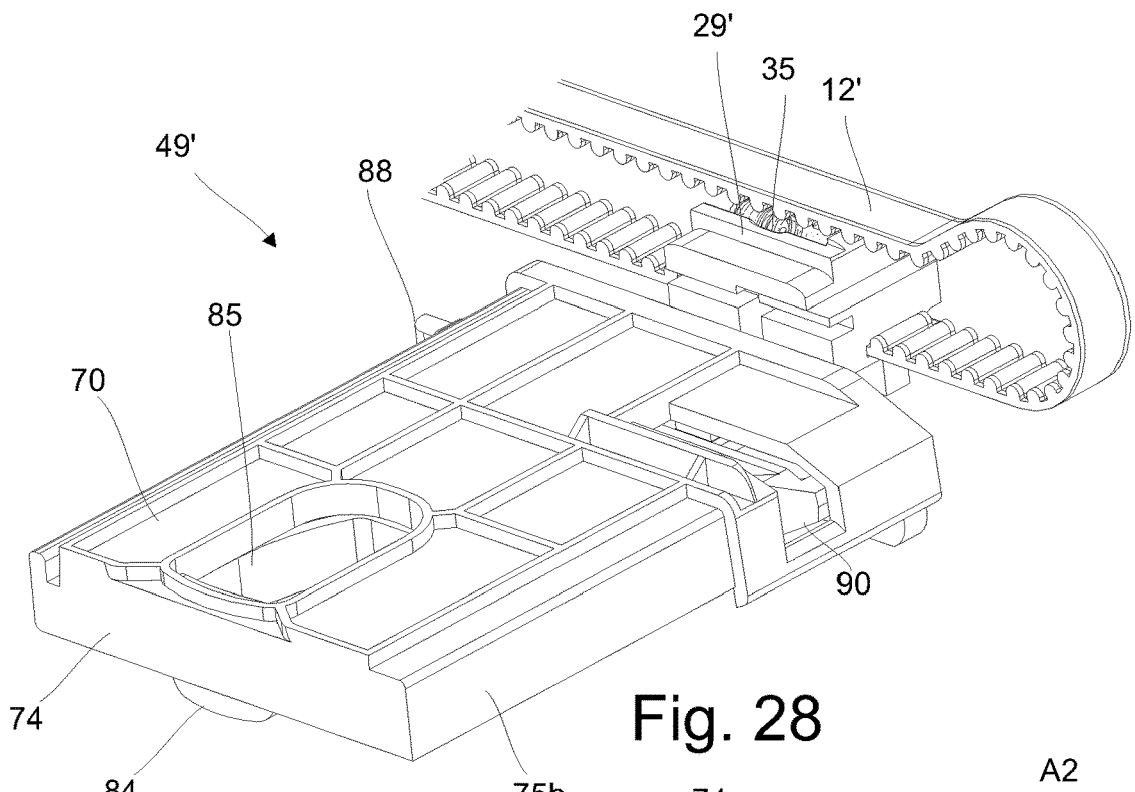
Figure 29:
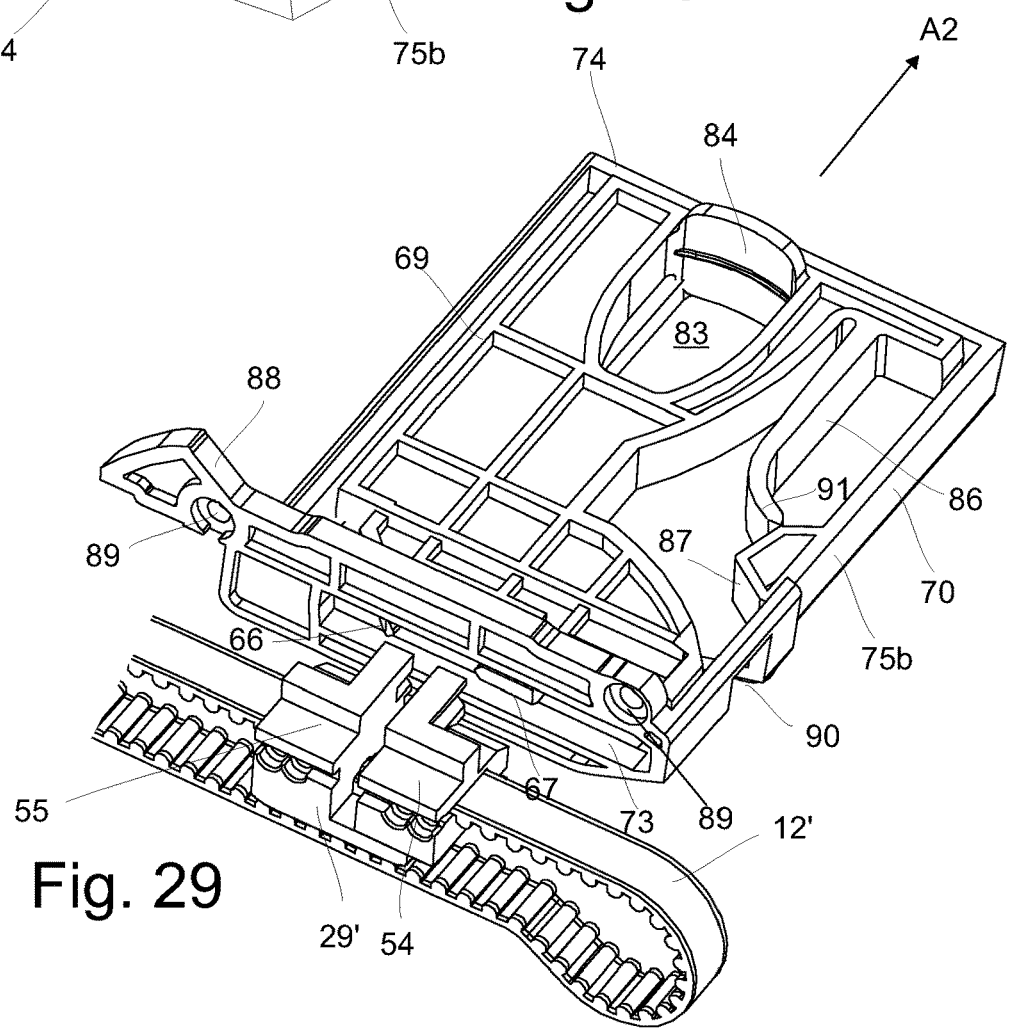
Figure 30:
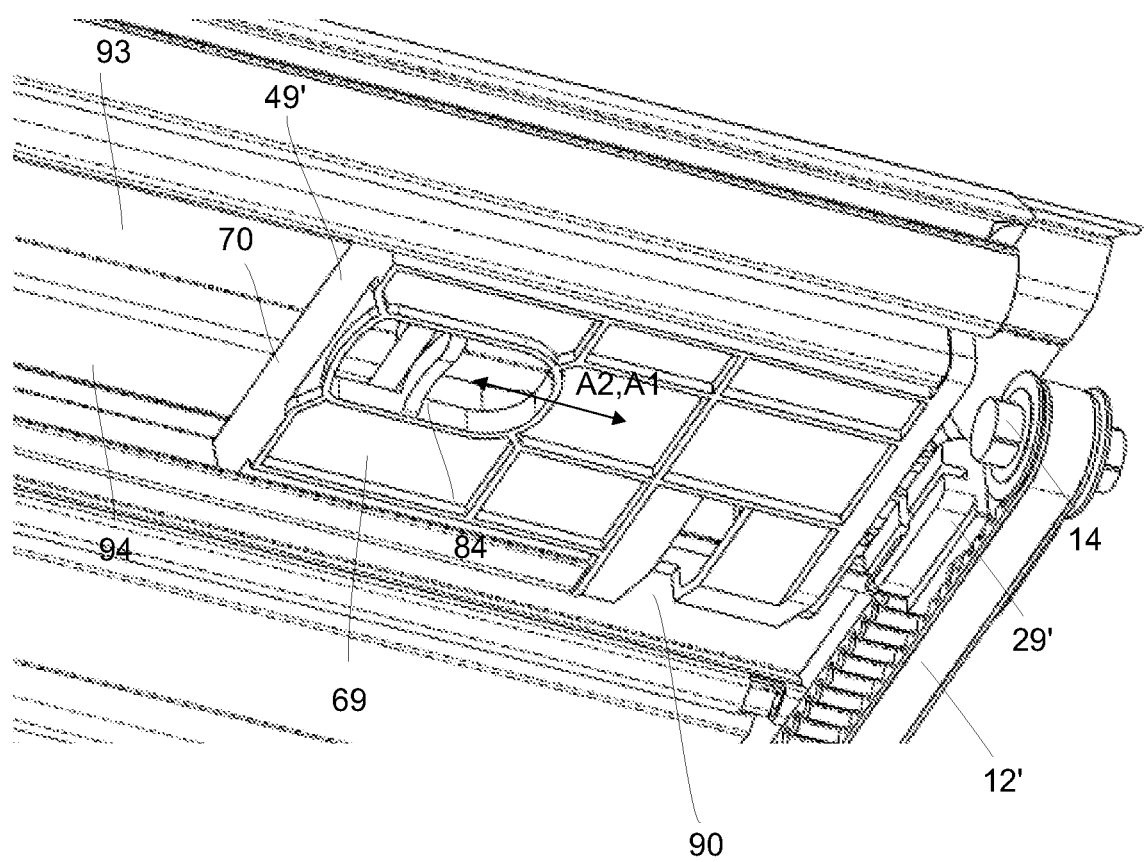

FIGS. 1a, 1b and 1c are perspective views of a pickup truck, seen from the tail gate, with a roll-up truck bed cover in extended position, partly retracted position, and fully retracted position, FIG. 2a is a perspective view seen from below the drive system according to the invention mounted to coupling rails that are adapted to be secured lengthwise to the truck bed, FIG. 2b shows the same seen from above, FIG. 3 is a perspective view seen from above and from the end facing the tail gate, of a short functional model showing details of the drive system according to the invention, FIG. 4 is an exploded, perspective view seen from above of the functional model shown in FIG. 3, FIG. 5 is a perspective view seen from below of the functional model shown in FIG. 3, FIG. 6 is a perspective view seen from below of parts of the functional model showing a set of pulleys with drive belt and a first embodiment of a resiliently extensible belt tensioner, FIG. 7 is a perspective view of the same parts as shown in FIG. 6 but seen slightly from above with the first embodiment of a resiliently extensible belt tensioner in separate exploded state, FIG. 8 is a fragmentary exploded, perspective view of a fragment of the drive system seen slightly from above from the idle pulley end and with the first embodiment of a resiliently extensible belt tensioner, FIG. 9 is a principle sketch of the functionality of the first embodiment of a resiliently extensible belt tensioner during retracting the roll-up truck bed cover into the retracted position, FIG. 10 is a principle sketch of the functionality of the first embodiment of a resiliently extensible belt tensioner during extending the roll-up truck bed cover into the extended position, FIG. 11 is a perspective view of the bracket bearings and the pulleys seen from the first bracket bearing, FIG. 12a is a perspective top view of the first bracket bearing, FIG. 12b is a perspective view seen from below of the second bracket bearing of the rear part, FIG. 13 is a cross-sectional view according to line XIII-XIII in FIG. 3 of the functional model, FIG. 14 is a fragmentary, enlarged scale perspective view of the engagement between the motor drive belt, the shaft pulley, the driven pulley, and the drive belt, and illustrating the first embodiment of a resiliently extensible belt tensioner, FIG. 15 shows the same parts as shown in FIG. 12 but seen from the motor drive belt, FIG. 16 is a perspective view seen from below of a fragment of the tail gate end of the functional model showing the idle pulley and part of the drive belt, FIG. 17 is a perspective exploded view of a second embodiment of a resiliently extensible belt tensioner seen from the face facing the plurality of slats of the roll-up truck bed cover, FIG. 18 shows the same in assembled state and seen from the opposite face, FIG. 19 is a fragmentary, perspective view of a guide profile for the second embodiment of a resiliently extensible belt tensioner, FIG. 20 corresponds to FIG. 18 but in assembled state of the second embodiment of a resiliently extensible belt tensioner on a second embodiment of a drive belt, FIG. 21 shows the same from the opposite side of the resiliently extensible belt tensioner, FIG. 22 is a perspective view of a connector component of an intermediate component in the form of a connector, which is seen from the side facing inside the truck bed, FIG. 23 is a perspective view of a housing component for the connector component seen in FIG. 22, where the housing component is seen from the side facing the rear profile, FIG. 24 shows the same as FIG. 23 but from the opposite side, FIG. 25 shows the same as FIG. 22 but from the opposite side, FIG. 26 shows, in perspective from the housing component, which is assembled with the connector, how the resiliently extensible belt tensioner engages the connector to open and close the roll-up truck bed cover if the connector is mounted to the rear profile of said roll-up truck bed cover, FIG. 27 shows the same from the connector component, FIG. 28 shows, in perspective from the assembled housing component and connector component, the connector disengaged from the resiliently extensible belt tensioner, FIG. 29 shows the same from the connector component, and FIG. 30 shows in fragmentary view and from below the rear profile, an embodiment of mounting the connector to said rear profile.

DETAILED DESCRIPTION OF THE INVENTION

Below the drive system is described in relation to a preferred embodiment under the assumption that the drive belt is a timing belt. This assumption should not be construed as limiting the scope of the present invention. As described above other types of drive belts are also foreseen. The functional model is shown to illustrate the principles of the drive system and the reciprocating means, and it is to be understood that the real drive system and reciprocating means is longer, as shown in e.g. FIGS. 2a to 2d. Since the length between the pulleys of the reciprocating means of the drive system is substantially longer than the width of the driving belt, the full length of the system cannot reveal the details in a sufficiently clear way. The functional model serves this purpose.

In FIGS. 1a, 1b and 1c a pickup truck 1 is schematically illustrated. The pickup truck 1 comprises a truck bed 2, which has sidewalls 3, a front wall 4 and a tail gate 5. The tail gate 5 is pivotally attached to a rear end 5a of the truck bed 2. A roll-up truck bed cover 6 is mounted to the top of the truck bed 2 and is movable between an extended position and a retracted position, as indicated by double arrow A. In FIG. 1a the roll-up truck bed cover 6 is shown in extended position, in FIG. 1b in partially retracted position, and in FIG. 1c in fully retracted position. The roll-up truck bed cover 6 is composed of a rear profile 7, a plurality of elongate slats 8 that are hinged together and having a foremost front slat 9 below a lid 9a for a canister 54 for the roll-up truck bed cover 6 in rolled-up condition. The lid 9a for the canister 54 may be detachable.

The roll-up truck bed cover 6 further comprises coupling rails 10, one mounted on top of each sidewall 3. The coupling rails 10 are intended to accommodate the ends of the rear profile 7, the ends of the slats 8, including the ends of the foremost front slat 9, in an extended or partially extended position, which ends together defines the free edge of the roll-up truck bed cover. During extension and retraction of the roll-up truck bed cover 6 the rear profile 7 and the interconnected slats 8 with the foremost front slat 9 are thus guided in the coupling rails 10. The coupling rails 10 are typically secured to the top of the sidewalls 3 by means of not shown clamps. The roll-up truck bed cover 6 can be of any conventional kind and the coupling rails designed to accommodate the free edge of the roll-up truck bed cover 6 in a sliding manner.

The coupling rails 10 as well as the rear profile 7, and the slats 8,9 may be made of aluminum, plastic or any other suitable material, e.g. by extrusion.

In FIGS. 2a and 2b is partly shown a drive system 11 to be mounted to the top of the sidewalls 3 of the truck bed 2 and configured for reciprocating the roll-up truck bed cover 6 between an extended position and a retracted position. The roll-up truck bed cover 6 is shown in FIGS. 2a and 2b in retracted position.

The shown drive system 11 comprises a reciprocating means 11a with two sets of pulleys 13,14 that reciprocate, not orbit, a drive belt 12 for extending and retracting the roll-up truck bed cover 6, respectively. An elongate guide profile 15 with an elongate guide track 15a accommodates the majority of the length of the respective drive belt 12 between the driven pulley 13 and the idle pulley 14 to protect the drive belt 12, e.g. when the truck bed is loaded and during driving with goods that can bounce and hit an unprotected drive belt. The elongate guide profiles also make a cosmetically attractive transition to the space of the truck bed and keep the drive belt under control.

As seen e.g. in FIG. 2a the coupling rails 10 maintain the free edge of the roll-up truck bed cover 6 in place over the truck bed 2 by accommodating the ends of the rear profile 7, and the ends of the slats 8, including the ends of foremost slat, the front slat 9. An electric motor 16 operates a drive belt 19 that is connected to shaft 17. The shaft 17 connects the driven pulleys 13 of the two sets of pulleys 13,14 to each other, which shaft 17 is arranged rotatable about its axis by the electric motor 16. In this way, the two sets of pulleys are driven synchronously, which means that there will be absolutely minimal if not no distortion of the slats 8 of the roll-up truck bed cover 6.

In FIG. 2a is seen the rear profile 7 and one slat 8 of the roll-up truck bed cover 6, whereas in FIG. 2b two slats 8 of the roll-up truck bed cover 6 is visible. The remaining slats 8 of the roll-up truck bed cover 6 are carefully wound up in the spiral-curved guide channel 18, as explained below.

Each of the two drive belts 12 is secured to the free ends of the rear profile 7 of the roll-up truck bed cover 6 e.g. directly by means of a fastener, or at least one of the drive belts 12 has an intermediate component that protrudes from the rear profile 7 to engage another component associated with the reciprocating means 11a, to drive the rear profile 7 and thus the truck bed cover 6. Such an intermediate component can be inserted to laterally couple the drive belt 12 and the rear profile 7. Such an intermediate component may e.g. be a component configured as a release component for disconnecting the drive of the electric motor 16 from the roll-up truck bed cover 6 so that the roll-up truck bed cover 6 can be operated manually, e.g. in case of malfunction or maintenance of the roll-up truck bed cover. The component, which the intermediate component engages, can e.g. be a first embodiment of a resiliently extensible belt tensioner 29 or a second embodiment of a resiliently extensible belt tensioner 29', the latter being described later in relation to FIGS. 17-30.

A very good and reliable operation and movement of the roll-up truck bed cover 6 is obtained without resulting in a loose or overstrained roll-up truck bed cover 6. In other words, it is ensured that the roll-up truck bed cover 6 is moved at exactly the same speed at both free edges of the roll-up truck bed cover 6.

In the embodiments shown in FIGS. 2a and 2b the drive belts 12 have not been shown in details, however it is to be understood that these exemplary drive belts 12 are toothed belts, such as a timing belt. Each drive belt may however also be constituted of a flat belt, a V-belt, a multi-groove belt, or a ribbed belt.

In order to collect the roll-up truck bed cover 6 when it is in a retracted or partly retracted position the drive system 11 comprises an elongate canister 54, as seen in FIG. 1c. The canister 54 comprises a spiral-curved guide channel 18 at each short ends (only one is shown) of the canister 54. The spiral-curved guide channels 18 are configured to guidingly wind up and receive the roll-up truck bed cover 6 when it is in a retracted or partly retracted position. In this way, the slats 8,9 of the roll-up truck bed cover 6 will be gently packed and accommodated in the canister 54 without contacting or being beaten against each other, thus minimizing the wear of the slats 8,9 of the roll-up truck bed cover 6.

As is apparent from FIGS. 2a and 2b the driven pulley 13 and the idle pulley 14 of each set of pulleys 13,14 are arranged at the opposite ends of the respective elongate guide profile 15. The length of the drive belts 12 or in other words the distance between the driven pulley 13 and the idle pulley 14 in each set of pulleys, and optionally the presence of a canister 54, determines the maximum possible displacement of the rear profile 7 and thus of the roll-up truck bed cover 6 along the coupling rails 10, but are in practice shorter, e.g. a length corresponding to the width of the rear profile, due to the attachment of the rear profile to the drive belt, and because the rear profile 7 is typically left outside the spiral-curved guide channel 18, such as above or in extension of the canister 54.

In operation the electric motor 16 rotates the shaft 17 via the motor drive belt 19. The shaft 17 drives synchronously the two driven pulleys 13 of the reciprocating means 11a at each opposite side of the drive systems 11 which again and at the same speed drive the two drive belts 12 in one of the two directions, indicated by arrow A in FIG. 1, thereby moving the rear profile 7 and thus the roll-up truck bed cover 6 in said one of the two directions. In FIGS. 2a to 2d the roll-up truck bed cover 6 is showed in its retracted position from where it may be moved in direction of the idle pulleys 14 into its extended position, not shown.

Instead of comprising only one electric motor 16 and the shaft 17 connecting the two driven pulleys 13, the drive system 11 may comprise two motors 16 arranged at each their side at each their set of pulleys, where each electric motor 16 drives one driven pulley 13. In such a drive system it is important that the two electric motors work synchronously, so that the roll-up truck bed cover 6 is moved at the same speed at both opposite sides, so that bending or skewing of the rear profile 7, the interconnected slats 8,9 of the roll-up truck bed cover 6 is avoided and that the roll-up truck bed cover 6 does not jam or get trapped. A suitable electric motor can e.g. be a 12V DC motor.

The drive system may also work with only one set of pulleys, thus only comprising and driving one drive belt 12 at one of the two free edges of the roll-up truck bed cover 6. This may require a somewhat rigid construction of the roll-up truck bed cover 6 in order to avoid skewing of the rear profile 7, the plurality of interconnected slats 8 and the front slat 9 of the roll-up truck bed cover 6 when it is moved into its extended or retracted position.

FIGS. 3 to 5 illustrate a functional model 21 with details of the drive system 11 and of the reciprocating means 11a seen in FIGS. 1a,1b,1c,2a and 2b, in accordance with the present invention. The functional model 21 only shows essential parts of the drive system 11 and their relationship to each other. The functional model 21 shows a delimited part of the drive system 11 and of the reciprocating means 11a, and the relative distance between the driven pulley 13 and the idle pulley 14 does not correspond to the reality. Thus in a real installation the drive belt 12, the coupling rail 10 and the elongate guide profile 15 are designed and selected to fit the actual truck bed and the roll-up truck bed cover. Preferably, the drive system 11 may have a reciprocating means 11a as schematised on both sidewalls 3 of the truck bed 2. The functional model of the drive system 11 is further shown without engaging a roll-up truck bed cover 6.

As illustrated by means of the functional model 21 the drive system 11 comprises the coupling rail 10 and a rear part 22, which is secured to the coupling rail 10 by means of screws 23 and may be covered by a not shown cover. The coupling rail 10 has a channel 41 used to guiding the slats 8,9 of the roll-up truck bed cover 6, not shown, when said roll-up truck bed cover 6 slides between the extended and retracted position.

The coupling rail 10 has a gutter 24a to direct rainwater away and a securing track 24b facing away from the truck bed. The securing track 24b may be used for attaching different objects, not shown, to the coupling rail 10. The rainwater can flow to the rear part 22 and down through an opening 25 in said rear part 22 and may flow further out of a drain 26 in said rear part 22, in case such drain 26 is provided. The rear part 22 provides a smooth termination of the drive system 11 with the coupling rail 10 when the said features are mounted to the truck bed.

As best seen in the exploded view of FIG. 4, the reciprocating means 11*a* of the drive system 11 comprises the driven pulley 13, the idle pulley 14 and the drive belt 12. In addition, the drive system 11 of the present embodiment comprises the elongate guide profile 15 with the elongate guide track 15*a* that in the assembled state of the drive system 11 shown in FIG. 3 accommodates and protects the majority of the length of the drive belt 12 between the driven pulley 13 and the idle pulley 14.

The reciprocating means 11*a* of the drive system 11 of the present embodiment also has a shaft pulley 27, which at a first end 27*a* has a bore (not seen in FIG. 4) to lockingly receive a first protruding shaft 28*a* that protrudes from the driven pulley 13 in order to rotate said driven pulley 13. At the opposite second end 27*b* of the shaft pulley 27, that shaft pulley 27 has a second protruding shaft 28*b* constructed to lockingly receive the shaft 17 to rotate said shaft 17 to drive the reciprocating means 11*a* of the drive system 11 at the opposite end of the shaft, as shown in FIGS. 2*a* to 2*d*.

The drive belt 12 of the reciprocating means 11*a* is constituted of a length of toothed belt 12 with first teeth 12*a*, which drive belt 12 serve as a timing belt. The length of toothed belt 12 is assembled into a loop by means of a first embodiment of a resiliently extensible belt tensioner 29. The first embodiment of a resiliently extensible belt tensioner 29 is explained in further details below.

The driven pulley 13 and the idle pulley 14 have second teeth or ribs 13*a* and 14*a* respectively and the shaft pulley 27 has shaft pulley teeth 27*a*. Hereby, the drive belt 12 may be driven in a very precise way involving no slippage and at constant speed. Thus, the wear on the drive belt 12 as well as the pulleys 13, 14 will be reduced to an absolutely minimum. The good engagement between the timing belt 12 and pulleys 13,14 makes the operation of the reciprocating means 11*a* low noise.

As may be understood from FIGS. 3 to 5 the driven pulley 13 is mounted in a first bracket bearing 43, whereas the idle pulley 14 is mounted in a second bracket bearing 44, the latter being arranged at the rear part 22.

As seen in FIGS. 5 and 6 the first bracket bearing 43 for the driven pulley 13 is secured to the coupling rail 10 by inserting and fastening an L-shaped hooking projection 40 of the first bracket bearing 43 into an elongate bottom slot 45 at the underside of the coupling rail 10.

The elongate guide profile 15 is press-fitted, or otherwise secured in between a first end surface 47 of the first bracket bearing 43 and a second end surface 48 of the second bracket bearing 44.

FIG. 6 is a fragmentary perspective view seen from below of the reciprocating means 11*a* of the functional model 21 without the shaft 17 and the second bracket bearing. The drive belt 12 runs around the idle pulley 14 and the driven pulley 13, and rotates these pulleys 13,14 in their respective bracket bearings 43,44 coupling rail. In addition, the resiliently extensible belt tensioner 29 is also shown in FIG. 6.

The first embodiment of a resiliently extensible belt tensioner 29 is in the following explained in further details with reference to FIGS. 7 to 10.

The resiliently extensible belt tensioner 29 comprises a first part 31, which is lengthwise axially coupled to a second part 33 in restricted extensible manner via an inserted spring 35. The first part 31 and the second part 33 clamps around the free ends 12*b*, 12*c* of the length of drive belt 12 to make said drive belt 12 into a slightly extensible loop due to the spring 35. In order to firmly engage the first teeth 12*a* of the drive belt 12 the first part 31 has mating first third teeth 38 and the second part 33 has mating second third teeth 39.

The distance between the first part 31 and the second part 33 are adjusted and kept under control, on the one hand due to said engagement between first teeth 12*a* and third teeth 38,39, and on the other hand due to the design of said first part 31 and said second part 33. So the first part 31 has a projecting L-shaped portion or claw 32 to hook into a groove or recess 34 of the second part 33 to provide space for adjusting said distance between the first part 31 and the second part 33 when the drive belt 12 moves. A bottom slide surface 31*a* of the first part 31 rests sliding on an upper slide surface 33*a* of the second part 33 with the L-shaped portion or claw 32 accommodated in the groove or recess 34 of the second part 33.

The spring 35, that keeps the drive belt 12 stretched at all times, is located in the groove or recess 34 behind the nose 36 of the projecting L-shaped portion or claw 32, so that said nose 36 can compress the spring 35 in the event that the drive belt is "overstretched", and the first part 31 and the second part 3 compresses the spring 35 against a bottom 37 of the groove or recess 34 that faces the first part 31. In this way, in the assembled state, the first part 31 and the second part 33 will be pushed towards each other by the spring 35, when stretching of belt is relieved due to relieving the compression force when the spring 35 returns to its relaxed condition.

Accordingly, the drive belt 12 affects the resiliently extensible belt tensioner 29 with forces that try to pull the first part 31 and the second part 33 of the resiliently extensible belt tensioner 29 away from each other, whereas the spring 35 on the other hand tries to push the first part 31 and the second part 33 of the resiliently extensible belt tensioner 29 towards each other until an equilibrium situation is present. Thus, the drive belt 12 will be biased with a certain tension and not be too loose.

The components of the resiliently extensible belt tensioner 29 is seen in a fragmentary exploded enlarge scale view in FIG. 8, which is a view from the driven pulley 13.

The first part 31 has a first main body 31*a* wherefrom the claw 32 projects perpendicularly with the nose 36 facing the drive belt 12. The first main body 31*a* has an I-shaped first bottom part 31*b* that delimits opposite first guide grooves 31*b'*,31*b"*. The first top part 31*c* above the I-shaped first bottom part 31*b* faces away from the drive belt 12 and has the first third teeth 38 inside a gap 31*d* into between the first bottom part 31*b* and the first top part 31*c*, into which the first end 12*b* of the drive belt 12 can be laterally inserted to be locked to the first part 31. The first guide grooves 31*b'*,31*b''* serve to engage the opposite guide webs 15*b*, see FIG. 4, of the elongate guide profile 15 so that the resiliently extensible belt tensioner 29 can ride on and/or under the control of the elongate guide profile 15 while being partly immersed inside the elongate guide track 15*a*, as seen in e.g. FIG. 3. The first top part 31*c* has a lateral first protrusion 31*c'* configured to engage an intermediate component 49, as illustrated in FIGS. 9 and 10. The intermediate component 49 is connected to the rear profile 7 to reciprocate together with the drive belt 12.

The second part 33 has a second main body 33*a* wherefrom a receiving part 33*b* protrudes axially towards the first part 31. The receiving part 33*b* has the groove or recess 34 that receives both the spring 35 and the sliding nose 36 of the first part 31. The second main body 33*a* has an I-shaped second bottom part 33*c* that delimits opposite second guide grooves 33*c'*,33*c''*. The second top part 33*d* on top of the I-shaped second bottom part 33*c* faces away from the drive belt 12 and has the second third teeth 39. The second top part 33d and the I-shaped second bottom part 33c delimits a gap 33e into which the second free end 12c of the drive belt 12 can be laterally inserted to be locked to the second part 33. The second guide grooves 33c',33c' ' serve to engage opposite guide webs 15b of the elongate guide profile 15 so that the resiliently extensible belt tensioner 29 is made to ride on and under the control of the elongate guide profile 15 while being partly immersed inside the elongate guide track 15a, as seen in e.g. FIG. 3. The second top part 33d has a lateral second protrusion 33d' configured to engage an intermediate component 49, as illustrated in FIGS. 9 and 10. The intermediate component 49 is connected to the rear profile 7 and reciprocates with the drive belt 12.

The height of the resiliently extensible belt tensioner 29 is selected so that it does not reach the bottom of the elongate guide profile 15 nor comes in any contact with the coupling rail 10 that would negatively affect the reciprocating of the roll-up truck bed cover 6, including avoiding friction.

The spring 35, which is placed in the groove or recess 34 of the second part 33 is confined behind the nose 36 of the first part 31 and the bottom 37 of the groove or recess 34 that faces the first part 31, respectively.

The shown and described resiliently extensible belt tensioner 29 may be used in all conceivable sizes for other applications where two parts needs to be pushed towards each other for tensioning a belt or a wire mounted to each of the two parts. So the extensible belt tensioner 29 may be used for other purposes than in a drive system according to the present invention.

FIG. 9 is a principle sketch of the functionality of the resiliently extensible belt tensioner 29 during retracting the roll-up truck bed cover 6 into the retracted position seen in FIG. 1c, as illustrated by arrow B. FIG. 10 is a principle sketch of the functionality of the resiliently extensible belt tensioner 29 during extending the roll-up truck bed cover 6 towards the extended position seen in FIG. 1a, as illustrated by arrow C.

The intermediate component 49 has a securing end part (not shown) secured to the rear profile 7 and an opposite bifurcated belt tensioner engaging end 50 with two protruding legs, a first protruding leg 51 space from a second protruding leg 52 by a reciprocating gap 53.

In the situation shown in FIG. 9 wherein the electric motor drives the driven pulley 13 and pulls the length of drive belt 12 shown in bold line in FIG. 9, as indicated by straight arrow B1 and curved arrow B2, the lateral second protrusion 33d' of the second part 33 engages the first protruding leg 51 of the bifurcated belt tensioner engaging end 50 of intermediate component 49, which is secured to the rear profile 7, whereby said rear profile 7 comes along and the roll-up truck bed cover 6 is being retracted to open the truck bed. At the same time the length of the drive belt 12 not being shown in fat line is kept stretched by the spring 35, which is a pressure spring, but only the length of the drive belt 12 which is shown in fat line in FIG. 9 is subjected to pulling forces.

In the situation shown in FIG. 10 has the rotation direction of the driven pulley 13 been reversed, as indicated by curved arrow C1, in order to extend the roll-up truck bed cover 6 to close the truck bed. When this is done the lateral first protrusion 31c' of the first part 31 of the resiliently extensible belt tensioner 29 engages the second protruding leg 52 of the intermediate component 49, which is secured to the rear profile 7, so that the rear profile 7 comes along and the roll-up truck bed cover 6 is being extended to close the truck bed. The length of the drive belt 12 that extends between the driven pulley 13 and the driving engagement between the lateral first protrusion 31c' of the first part 31 and the second leg 52 of the intermediate component 49 is the pulled length of the drive belt 12 which is subjected to pulling forces, as shown in fat line in FIG. 10, and indicated by arrows C1-C4.

FIG. 11 shows, in perspective, the first bracket bearing 43, the second bracket bearing 44 located in the rear part 22, the driven pulley 13, the idle pulley 14, and the shaft pulley 27.

The driven pulley 13 has a driven pulley shaft 52 that extends on opposite sides of the toothed wheel body 13b with second teeth 13a. The driven pulley shaft 52 has a first protruding shaft 28a that protrudes from the driven pulley 13 in order to rotate said driven pulley 13 upon engaging the shaft pulley 27. The idle pulley 14 has an idle pulley shaft 53 that extends on opposite sides of the toothed wheel body 14b with second teeth 14a. The shaft pulley 27 has a shaft pulley shaft 27' that extends on opposite sides of the toothed wheel body 27". The shaft pulley shaft 27' has a second end 27b with a second protruding shaft 28b that couple with the shaft 17 to drive the drive belt via the electric motor and an opposite first end 27c that couple to the driven pulley 13.

As seen in FIG. 12a the first bracket bearing 43 has the L-shaped laterally hooking projection 40 to couple to the coupling rail 10 and axially protruding first extensions 40' for coupling to the free end of the elongate guide profile 15 by press-fitting into channels 15c delimited lengthwise between the bottom 15d of the elongate guide profile 15 and opposite guide webs 15b provided for reciprocating the resiliently extensible belt tensioner 29. A first bearing groove 43' serves to receive the driven pulley 13 in rotatory manner.

FIG. 12b shows the rear part 22 from below, and FIG. 11 shows the same from above. The rear part 22 has a coupling flange 22a for coupling to the free end of the coupling rail 10 at a tail gate corner of the truck bed, as also seen in FIG. 4. To that aspect the coupling flange 22a has screw holes 22b and the coupling rail 10 has aligned screw holes 22c. The first bracket bearing 43 of the rear profile 22 has axially protruding second extensions 40" for coupling to the free end of the elongate guide profile 15 opposite the first bracket bearing 43 in same manner as described for said first bracket bearing 43. When the rear part 22 and the first bracket both are coupled to the elongate guide profile 15 the drive belt 12 moves partly inside the elongate guide profile 15. A second bearing groove 44' serves to receive the idle pulley 14 in rotatory manner.

FIG. 13 is a cross-sectional view according to line XI-XI in FIG. 3 that shows an embodiment of the profile of the coupling rail 10 with the gutter 24 to direct rainwater away from the coupling rail 10 and the lengthwise extending channel 41 to accommodate the rear profile 7, the interconnected slats 8 with its foremost front slat 9 of the roll-up truck bed cover 6 when it is moved. The coupling rail 10 is formed with a lengthwise extending end stop surface 46 inside the channel 41, which end stop surface 46 constitutes an end stop for the rear profile 7, the slats 8 and the front slat 9 of the roll-up truck bed cover 6 for moving in their longitudinal direction, that is, across the direction of movement of the roll-up truck bed cover 6.

The position of the driven pulley 13 in the first bracket bearing 43 and the drive belt 12 around the driven pulley 13 is shown in relation to the elongate guide profile 15 with the elongate guide track 15a that protects the drive belt 12. The projection 40 of the first bracket bearing 43 engages the elongate bottom slot 45 of the coupling rail 10, thus securing the first bracket bearing 43 to the coupling rail 10. Said securing can in the alternative or as a supplement be accomplished using screws or other fasteners.

The coupling rail 10 comprises a planar surface 42 intended to be placed on top of the sidewall 3 of the truck bed 2, as shown in FIG. 1. It should be noted that the drive system of the present invention is not limited to coupling rails placed on top of the sidewall 3 of the truck bed 2. The drive system can also be used together with coupling rails more or less embedded in the truck bed or aligned with a top edge of the truck bed.

Securing means, not shown, may be placed in the elongate slot 45 to secure the coupling rail 10 to the sidewall 3 of the truck bed 2. The second protruding shaft 28b of the shaft pulley 27, which is used as the driving pin for rotating the shaft 17, may in the alternative extend to the opposite sidewall 3 of the truck bed 2, where a similar but inverted coupling rail 10 with a set of pulleys, including a driven pulley 13 and a drive belt 12 etc. may be provided, so that the opposite second protruding shafts 28b of opposite drive systems together constitutes the shaft 17. This alternative embodiment does however place a significant demand on tolerances and measuring to make the shaft and drive system fit the truck bed perfectly, whereas an embodiment with a separate shaft allows the same drive system to be used with different shaft lengths.

In FIGS. 14 and 15 the elongate guide profile 15 is left out for visual purposes to better overview motor drive system. A motor shaft pulley 50 is connected to a not shown motor via the toothed motor drive belt 19 that drives the shaft pulley 27 and thus the shaft 17. The shaft 17 is connected to and drives the driven pulley 13, which again drives the drive belt 12 in any of the two directions indicated by arrow A in FIG. 1.

As mentioned above the shaft 17 may be connected to a second driven pulley 13, not shown, situated at the opposite sidewall 3 of the truck bed 2, so that the drive systems comprises two identical reciprocating means 11a, one at each sidewall 3, not shown, of the truck bed 2, although just one electrical motor may suffice. By providing the two opposite pulley systems with one and the same shaft 17 for rotating the driven pulleys 13 it is ensured that the roll-up truck bed cover 6 is drawn in the intended direction synchronously at exactly the same speed at both sides of the roll-up truck bed cover 6. Hereby, the wear on the slats 8 of the roll-up truck bed cover 6 will be minimal and the lifetime significantly extended.

FIGS. 14 and 15 show that the drive belt 12 is a toothed drive belt and that the driven pulley 13 likewise is a toothed pulley. The not shown idle pulley 14 is also a toothed pulley. The first teeth 12a of the drive belt 12 engage the second teeth 13a of the driven pulley 13 and the second teeth 14a of the idle pulley 14 when said pulleys 13,14 rotate. Thus, the roll-up truck bed cover 6 may be driven into its intended positions in a very precise way involving no slippage and at selected speed.

As seen in FIG. 14 the driven pulley 13 has a driven pulley shaft 52 rotatingly placed, e.g. journaled, in the first bracket bearing 43. The idle pulley 14 has an idle pulley shaft 53 rotatingly placed in the second bracket bearing 44 that are integral with the rear part 22, as seen in FIG. 16 of the functional model 21 from below.

FIGS. 17-21 show a second embodiment of a resiliently extensible belt tensioner 29'. The second embodiment of a resiliently extensible belt tensioner 29' corresponds substantially to the first embodiment of a resiliently extensible belt tensioner 29 and for like parts same reference numerals are used.

The second embodiment of a resiliently extensible belt tensioner 29' comprises a first part 54 and a second part 55 connected in restricted extensible manner via an inserted spring 35, in the same manner as the first embodiment of a resiliently extensible belt tensioner 29.

The first part 54 and the second part 55 clamp around the free ends of the second embodiment of a drive belt 12', as seen in FIGS. 20 and 21, in the same manner as the first embodiment of a resiliently extensible belt tensioner 29 due to the first part 54 having first third teeth 56 and the second part 55 having second third teeth 57. The first third teeth 56 and the second third teeth 57 of the resiliently extensible belt tensioner 29' have a semi-circular cross-section but serve the same function as the first third teeth 38 and the second third teeth 39 of the first embodiment of a resiliently extensible belt tensioner 29, which teeth 38,39 have flat-bottom U-shaped cross-sections where the opposite legs of the U diverge. The cross-sections of the first third teeth 38,56 and of the second third teeth 39,57, respectively, are selected to securely mate and engage the teeth 12a,58 of the drive belt 12,12', respectively. So the configuration of the respective first third teeth 38,56 and the respective second third teeth 39,57 is adapted to drive a correspondingly configured respective drive belt 12,12', wherein a tooth on one of the engaging parts engage a gap between opposite teeth of the other part.

It is emphasized that the second teeth or second ribs of the driven pulley and of the idle pulley are also adapted and configured to engage the first teeth 58 of the second embodiment of a drive belt 12'.

The first part 54 has a projecting L-shaped portion or claw 32 to hook into a groove or recess 34 of the second part 55, in which groove the spring is positioned, to provide space for spring-biased adjusting of the distance between said first part 54 and second part 55.

As described in relation to FIGS. 9 and 10 the extensible distance between the first part 54 and second part 55 is resiliently controlled by the spring 35 in a similar manner as described for the first embodiment of a resiliently extensible belt tensioner 29 when the electric motor drives the roll-up truck bed cover 6 to open and closed positions.

The second embodiment of a resiliently extensible belt tensioner 29' differs from the first embodiment of a resiliently extensible belt tensioner 29 in particular in the configuration of the respective first top part 54a of the first part 54 and the respective second top part 55a of the second part 55, and in that the configuration of the first bottom part 54b of the first part 54 and the second bottom part 55b of the second part 55 have different shapes to allow said bottom parts 54b,55b to be slidingly suspended on a guide web 59 or guide rail inside a second embodiment of a guide profile 60 that in use surrounds and protects the drive belt 12' and associated resiliently extensible belt tensioner 29', as also shown for the first embodiment of a resiliently extensible belt tensioner 29, as exemplified in FIG. 3.

The fragment of the guide profile is seen in enlarged scale view in FIG. 19 from a free end.

The first bottom part 54b of the first part 54 has a first guide groove 54c and the second bottom part 55b of the second part 55 has a second guide groove 55c. The guide web 59 of the guide profile slides inside aligned first guide groove 54c and second guide groove 55c in a manner similar to the manner described in relation to FIG. 4 for the first embodiment of a resiliently extensible belt tensioner 29, while a protruding slide foot 61 of the second bottom part 55b slides freely in a third guide groove 62 of the guide profile 60, which third guide groove 62 is delimited by opposite stepped guide webs 63a,63b that protrude towards each other inside the guide profile 50 above the bottom 15d of the guide profile 60.

The first top part 54 has a lateral first protrusion 64 and the second top part 55 has a lateral second protrusion 65 facing in same direction as the lateral first protrusion 64 and towards the rear profile 7 in the operative condition of the resiliently extensible belt tensioner 29'. In the present embodiment the lateral first protrusion 64 and the lateral second protrusion 65 are substantially parallel.

The lateral first protrusion 64 has a first exterior lateral engagement face 64a with a first exterior coupling groove 64b and a first interior lateral face 64c with an optional first interior groove 64d. The lateral second protrusion 65 has a second exterior lateral engagement face 65a with a second exterior coupling groove 65b and a second interior face 65c with an optional second interior groove 65d.

The interior coupling grooves 64d,65d are beneficial in case of need to get access to manually move the first part and the second part apart from each other.

The first exterior coupling groove 64b and the first interior groove 64d are axially offset in relation to each other along the height of the first top part 54, whereby the first interior groove 64d is closer to the roll-up truck bed cover 6 than the first exterior coupling groove 64b in the operative of the resiliently extensible belt tensioner 29'.

Similarly the second exterior coupling groove 65b and the second interior groove 65d are offset in relation to each other along the height of the second top part 55, whereby the second interior groove 65d is closer to the roll-up truck bed cover 6 than the second exterior coupling groove 65b, to be easy to get hold on in case the first top part and the second top need to be pulled apart.

As seen best in FIGS. 18, 20 and 21 the first top part 54a delimits a first gap 54a' into which the first free end 12c' of the second embodiment of the drive belt 12' can be laterally inserted to be locked to the first part 54, and oppositely the second top part 55a delimits a second gap 55a' into which the second free end 12b' of the second embodiment of the drive belt 12' can be laterally inserted to be locked to the second part 55 to allow the resiliently extensible belt tensioner 29' to reciprocate along with the drive belt 12'.

The first exterior coupling groove 64b of the lateral first protrusion 64 and the second exterior coupling groove 65b of the lateral second protrusion 65 of the second embodiment of the resiliently extensible belt tensioner 29' are configured to engage a first protruding leg 66 and a second protruding leg 67 of a belt tensioner engaging end 68 of a connector component 69 of the connector 49' seen in the exploded and assembled views of FIGS. 22-30.

The connector 49' comprises the housing component 70 seen in FIGS. 23 and 24, and the connector component 69 seen in FIGS. 22 and 25. The housing component 70 accommodates the connector component 69 in reciprocating manner and is secured to the rear profile 7 of the roll-up truck bed cover 6, e.g. by means of screws. For example the connector 49' is inserted sidewise into a free end of the rear profile 7. The reciprocating direction is parallel to the longitudinal axis of the rear profile 7, as indicated by arrows A1,A2.

The housing component 70 has a securing end part 71 configured as a tray for accommodating the connector component 69.

The securing end part 71 of the housing component 70 has a tray bottom wall 72, a first tray end wall 73 facing towards a free end of the rear profile 7, an opposite second tray end wall 74, and opposite tray side walls 75a,75b extending between the first tray end wall 73 and the second tray end wall 74.

The first tray end wall 73 has a first tray opening 76 through which the fork or bifurcation defined by the protruding legs 66,67 of the connector component 69 can be exposed by being moved into the direction indicated by arrow A1. The protruding legs 66,67 can be retracted from the first tray opening 76 by being moved into the direction indicated by arrow A2.

The walls 72,73,74,75a,75b define a tray cavity 77 into which the connector component 69 fittingly can reciprocate to allow the above mentioned exposing and retracting.

The belt tensioner engaging end 68 of the connector component 69 has its protruding legs 66,67 in resilient engagement with the exterior coupling grooves 64b,65b of the top parts 54,55 of the resiliently extensible belt tensioner 29', as shown in FIGS. 26 and 27, similar as also described in relation to FIGS. 9 and 10 for the first embodiment of a resiliently extensible belt tensioner 29. When the electric motor drives the drive belt the rear profile moves as well due to this engaging. Further, due to this engaging the electric motor can stop moving the drive belt 29, and thus, move the rear profile 7 to place the associated roll-up truck bed cover 6 in any desired open or closed position.

The connector component 69 has a main connector body 78 composed of a first connector end part 79 with a first connector end 80 that has the protruding legs 66,67, and an opposite second connector end part 81 with a second connector end 82. As seen in FIG. 27, when the connector component 49' engages the resiliently extensible belt tensioner 29' the legs 66,67 protrude from the first connector end 80 through the first tray opening 76 in the assembled state of the connector 49'.

The second connector end part 81 of the connector component 69 has a connector opening 83, which connector opening 83 has a finger grip 84 that protrudes out of a second tray opening 85 in the tray bottom wall 72. The second tray opening 85 starts close to the second tray end wall 74. In the exemplary embodiment of a tray component 70 the second tray opening 85 is an elongate slot.

In the position wherein the connector 49' is inserted into the rear profile 7 via a free end of the rear profile the finger grip 84 extends out of the second tray opening 85, and optionally out of a correspondingly operating opening (not shown) in the side of the rear profile 7 facing inside the truck bed. Thus the finger grip 84 faces inside the truck bed to be accessible for manual operation, e.g. in case the electric motor stops working. In such cases the finger grip 84 is simply moved manually from inside the truck bed in the direction of arrow A2 to set the engagement between the legs 66,67 of the connector component 69 free of the exterior coupling grooves 64b,65b of the resiliently extensible belt tensioner 29', thereby subsequently allowing the roll-up truck bed cover 6 to be pushed and pulled manually along the coupling rails 10. The length and shape of the second tray opening 85 and of the operating opening define the maximum possible travel length L of the connector component 69 in relation to the housing component 70. The actual travel length L may be shorter depending on the distance to the resiliently extensible belt tensioner 29', but the travel length L of the connector component 69 is so long that the legs 66,67 of the connector component 69 are displaced to fully disengage or engage the resiliently extensible belt tensioner 29'.

The connector 49' can e.g. be inserted and held in a track 93 provided at the underside 94 of the rear profile 7, as seen in FIG. 30.

The exterior coupling grooves 64b,65b are the female parts and the legs 66,67 are the male parts fitting inside the female parts. In the present embodiment both the coupling grooves 64b,65b and the legs 66,67 have substantially triangular cross-sections so that a leg 66,67 is naturally guided laterally inside the exterior coupling groove 64b,65b in front of said leg 66,67 to achieve mutual engagement, thus into the position seen in FIG. 27, a position, which is maintained as long as the roll-up truck bed cover 6 is electrically operated and smoothly runs open and closed without e.g. getting stuck in an intermediate half-open/half-closed position.

To keep the resiliently extensible belt tensioner 29' and the connector 49' in engagement, the legs 66,67 of the connector component 69 must be kept exposed from the housing component 70. To that aspect the second connector end part 81 has a locking pawl 86 protruding from second connector end 82 a distance along the second connector end part 81 towards the first connector end part 79 along the tray side walls 75b. The locking pawl 86 serves to engage a locking tooth 87 or similar protrusion on the tray side walls 75b, as seen best in the assembled views of FIGS. 27 and 29.

In the engaged position seen in FIG. 27 the connector component 69 has been moved the travel length L towards the resiliently extensible belt tensioner 29', whereby a hooking end 91 of the locking pawl 86 resiliently and biased passes by the locking tooth 87 and locks the connector component 69 in the forward engaging position. In the position seen in FIGS. 28 and 29 the connector component 69 is retracted back into the housing component 70 and the hooking end 91 of the locking pawl 86 is not biased anymore, but free of the locking tooth 87. The position of the connector component 69 seen in FIGS. 28 and 29 is simply achieved by pulling the finger grip 84, that protrude from aligned operating opening (not shown) of the rear profile and the second tray opening 85 of the housing component 70 in the direction of the arrow A2 from inside the truck bed.

The housing component 70 further has a mounting flange 88 with screw holes 89 for securing the housing component to the rear profile, e.g. at the free end of the rear profile, but can be mounted to the rear profile using any other suitable means. The connector can e.g. be forced-fitted into the free end of a hollow rear profile, or can be secured by means of screws.

The housing component 70 also has a third tray opening 90 that extend from the tray bottom wall 72 into the tray side wall 75b. After a connector 49,49' has been manually disengaged its associated resiliently extensible belt tensioner 29,29' engagement of said connector 49,49' and said resiliently extensible belt tensioner 29,29' must be reestablished to allow the motor to operate the roll-up truck bed cover 6.

The finger grips 84 can be used for this purpose. However in the embodiment of a roll-up truck bed cover 6 of the present invention that has a drive system that comprises two opposite pulley systems, one at each long side of the truck bed, reestablishing engagement between a connector 49,49' and its associated resiliently extensible belt tensioner 29,29' must be attended to at both long sides of the truck bed.

To get the opposite resiliently extensible belt tensioners properly aligned again the finger grip 84 of one of the connector components 49' is manually put into engagement with the associated resiliently extensible belt tensioner 29'. Then the roll-up truck bed cover 6 is pushed fully open manually. Thereby the movement of the connector housings 70 of opposite connectors 49' are stopped in aligned positions and a rigid trigger (not shown) on the canister moves inside the third tray opening 90. The rigid trigger may be a protruding post or rod that gradually slides on a curved face 92 of the connector component 69 parallel to the tray bottom wall 77, which causes displacing of the connector component 49' in the direction of arrow A1 whereby the locking pawl 91 passes by the locking tooth 87, thereby inserting the legs 66,67 in the exterior coupling grooves 64d,65d.

So complete reestablishing of engagement between respective opposite sets of connector 49' and resiliently extensible belt tensioners 29,29' is eventually done automatically when the rear profile reach the canister.

The shown and described functional principle of the resiliently extensible resiliently extensible belt tensioners 29;29' of the present invention may be used in all conceivable sizes and shapes of resiliently extensible belt tensioners for other applications where two parts needs to be pushed towards each other for tensioning a belt or a wire mounted to each of the two parts. So the extensible belt tensioner 29;29' may be used for other purposes than in a drive system according to the present invention. Furthermore the connector 49;49' is not limited to use with the resiliently extensible belt tensioners of the present invention. An alternative component to the resiliently extensible belt tensioner may be any component that has female coupling grooves to catch and engage the legs of the connector component.

The drive system of the present invention is described above in relation to a roll-up truck bed cover comprised of interconnected rigid slat. The drive system of the present invention can however also be used to drive a soft flexible roll-up truck bed cover, e.g. a fabric cover.

The invention claimed is:

1. A drive system configured for reciprocating, between an extended position and a retracted position, a roll-up truck bed cover above a truck bed, said roll-up truck bed cover being composed of a rear profile, a plurality of elongate slats that are hinged together wherein the plurality of elongate slats has a foremost front slat, said drive system comprising at least one reciprocating means adapted for reciprocating the roll-up truck bed cover, and at least one reversible electric motor adapted for driving the reciprocating means,
   the at least one reciprocating means comprises at least one pulley system comprising at least one set of pulleys and at least one drive belt, which at least one set of pulleys includes a driven pulley and an idle pulley, wherein
   the drive belt is secured to the rear profile of the roll-up truck bed cover via an intermediate component that protrudes from the rear profile to detachably or directly engage a resiliently extensible belt tensioner on the drive belt.

2. A drive system according to claim 1, wherein the drive system comprises two opposite pulley systems, and a shaft connecting the corresponding driven pulleys of each pulley system to each other, which shaft is arranged rotatable about its axis by the electric motor.

3. A drive system according to claim 1, wherein the drive belt is a flat belt, a V-belt, a multi-groove belt, a ribbed belt, a toothed belt or a timing belt.

4. A drive system according to claim 1, wherein the drive belt has first teeth or first ribs, and the driven pulley and the idle pulley has second teeth or second ribs that engage the first teeth or first ribs.

5. A drive system according to claim 1, wherein the drive belt is a length of toothed or ribbed belt or strip having a first free end and an opposite second free end, which first free end and second free end are assembled into a loop by means of the resiliently extensible belt tensioner, which resiliently extensible belt tensioner has third teeth or third ribs configured for engaging the first teeth or first ribs of the driving belt.

6. A drive system according to claim 1, wherein the resiliently extensible belt tensioner comprises a first part having a projecting L-shaped portion or claw and a second part having a groove or recess for accommodating the L-shaped portion or claw of the first part, and a spring placed in the groove or recess and abutting against a first surface of the first part and a second surface of the second part, respectively.

7. A drive system according to claim 6, wherein
the first part has a first top part and a first bottom part, which first top part has a lateral first protrusion for engaging the intermediate component provided on the rear profile, and
the second part has a second top part and a second bottom part, which second top part has a lateral second protrusion for engaging the intermediate component.

8. A drive system according to claim 7, wherein the intermediate component has protruding legs to engage the respective lateral protrusions.

9. A drive system according to claim 1, wherein the reciprocating means comprises an elongate guide profile with an elongate guide track that accommodates at least the majority of the length of the drive belt between the driven pulley and the idle pulley, and bracket bearings for the driven pulley and the idle pulley, respectively, at opposite ends of the elongate guide track.

10. A drive system according to claim 9, wherein the resiliently extensible belt tensioner has a slide foot that slides in the elongate guide track.

11. A drive system according to claim 1, wherein the roll-up truck bed cover reciprocating means includes a shaft pulley driven about its rotation axis via a motor drive belt by the electric motor, which shaft pulley having a first shaft pulley end secured to the driven pulley and an opposite second shaft pulley end secured to the shaft that extends to connect the driven pulleys of opposite drive systems.

12. A drive system according to claim 1, wherein the drive system further comprises an elongate canister for collecting the roll-up truck bed cover during its retracting, which canister has opposite first and second spiral-curved guide channels at opposite short ends of the canister, which opposite first and second spiral-curved guide channels are configured to receive a free edge of the roll-up truck bed cover.

13. A roll-up truck bed cover comprising a plurality of interconnected slats and the drive system according to claim 1, wherein the roll-up truck bed cover has the rear profile a provided at a rear end of the plurality of interconnected slats and the foremost front slat of the plurality of interconnected slats at the opposite end of the plurality of interconnected slats.

14. A roll-up truck bed cover according to claim 13, wherein the rear profile is secured to the drive belt via the intermediate component that protrudes from the rear profile to detachably engage the resiliently extensible belt tensioner of the reciprocating means.

15. A roll-up truck bed cover according to claim 13, wherein the intermediate component is a connector comprising a housing component and a connector component arranged in the housing component to engage the resiliently extensible belt tensioner of the reciprocating means.

16. A roll-up truck bed cover according to claim 15, wherein the housing component is inserted into the rear profile at a free end of said rear profile, and with the connector component reciprocatingly arranged in the housing component to be exposable from the housing component to engage the resiliently extensible belt tensioner on the drive belt, and to be retractable towards the housing component to disengage the resiliently extensible belt tensioner on the drive belt.

17. A roll-up truck bed cover according to claim 15, wherein
the housing component comprises a securing end part adapted for being inserted into the free end of the rear profile and being configured as a tray for accommodating the connector component, which securing end part comprises
a tray bottom wall, a first tray end wall facing towards the drive belt, an opposite second tray end wall, and opposite tray side walls extending between the first tray end wall and the second tray end wall,
the first tray end wall has a first tray opening, and
the tray bottom wall has a second tray opening,
the connector component comprises a main connector body composed of a first connector end part with a first connector end and an opposite second connector end part with a second connector end, wherein
the first connector end comprises a fork or bifurcation aligned with the first tray opening when the connector component is arranged in the housing component to be exposed from said first tray opening.

18. A roll-up truck bed cover according to claim 17, wherein the second connector end part has a connector opening with a finger grip that protrudes out of the second tray opening in the assembled state of the connector component and housing component to be grasped to reciprocate the connector component in and along the housing component.

19. A roll-up truck bed cover according to claim 15, wherein the connector component has a locking pawl to detachably engage a locking tooth of the housing component.

20. A roll-up truck bed cover according to claim 17, wherein the housing component has a third tray opening, and the first connector end part has a curved face aligned with the third tray opening.

21. A roll-up truck bed cover according to claim 17, wherein a side of the rear profile that faces inside the truck bed has an operating opening aligned with the second tray opening.

22. A roll-up truck bed cover according to claim 20, wherein a trigger rod is provided at the front end of the truck bed to move inside the third tray opening to displaced the connector component by moving along curved face.

23. A truck bed comprising a roll-up truck bed cover according to claim 12.

* * * * *